US012598174B2

(12) United States Patent
Horowitz et al.

(10) Patent No.: US 12,598,174 B2
(45) Date of Patent: *\*Apr. 7, 2026**

(54) FLEET MANAGEMENT SYSTEM AND METHOD

(71) Applicant: Viam Inc., New York, NY (US)

(72) Inventors: Eliot Horowitz, New York, NY (US); Eric Daniels, New York, NY (US)

(73) Assignee: Viam Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,916

(22) Filed: Jun. 19, 2024

(65) Prior Publication Data

US 2024/0340279 A1 Oct. 10, 2024

Related U.S. Application Data

(63) Continuation of application No. 18/224,785, filed on Jul. 21, 2023, now Pat. No. 12,047,369.

(60) Provisional application No. 63/406,062, filed on Sep. 13, 2022, provisional application No. 63/391,673, filed on Jul. 22, 2022.

(51) Int. Cl.
*H04L 29/06* (2006.01)
*H04L 9/40* (2022.01)
*H04L 67/12* (2022.01)

(52) U.S. Cl.
CPC .......... *H04L 63/0823* (2013.01); *H04L 67/12* (2013.01)

(58) Field of Classification Search
CPC ....................................................... H04L 67/12
See application file for complete search history.

(56) References Cited

U.S. PATENT DOCUMENTS

| | | | |
|---|---|---|---|
| 7,133,830 B1 | 11/2006 | Hoban et al. | |
| 10,216,185 B2 | 2/2019 | Kotlyarov | |
| 10,447,683 B1 | 10/2019 | Loladia et al. | |
| 10,461,943 B1 | 10/2019 | Norum | |
| 11,254,003 B1 | 2/2022 | Zhao | |
| 11,388,594 B2 * | 7/2022 | Uy ........................ | H04L 9/0844 |
| 2003/0233571 A1 | 12/2003 | Kraus et al. | |
| 2004/0236693 A1 | 11/2004 | Quesselaire | |
| 2005/0081029 A1 * | 4/2005 | Thornton .............. | H04L 9/3226 |
| | | | 713/156 |
| 2005/0149947 A1 | 7/2005 | Callender | |
| 2011/0071672 A1 | 3/2011 | Sanders et al. | |
| 2013/0295902 A1 | 11/2013 | Justen et al. | |
| 2015/0088357 A1 | 3/2015 | Yopp | |

(Continued)

OTHER PUBLICATIONS

May Takada et al., An Experimental Analysis on Latency Improvement of Cloud-based Fleet Management System, Dec. 2014, ACM, pp. 505-506. (Year: 2014).*

(Continued)

*Primary Examiner* — Kari L Schmidt
*Assistant Examiner* — Fahimeh Mohammadi
(74) *Attorney, Agent, or Firm* — Jeffrey Schox; Diana Lin

(57) ABSTRACT

In variants, a fleet management method can include: determining information about a device; and sending information to the device, including authentication credentials, wherein the device can authenticate itself with other devices within the fleet using the authentication credentials. The fleet management system can function to scalably manage the operation and permissioning of one or more fleets of devices.

19 Claims, 21 Drawing Sheets

(56) References Cited

U.S. PATENT DOCUMENTS

| | | | |
|---|---|---|---|
| 2015/0180653 A1 | 6/2015 | Nix | |
| 2016/0055677 A1 | 2/2016 | Kuffner | |
| 2017/0006022 A1* | 1/2017 | Gunti | H04L 63/0823 |
| 2017/0054564 A1* | 2/2017 | Bone | H04L 63/0272 |
| 2017/0094033 A1 | 3/2017 | Sathyadevan et al. | |
| 2017/0163693 A1 | 6/2017 | Skuratovich et al. | |
| 2017/0201585 A1* | 7/2017 | Doraiswamy | H04L 41/0806 |
| 2017/0232612 A1* | 8/2017 | Gallagher | B25J 9/16 |
| | | | 700/249 |
| 2018/0006829 A1 | 1/2018 | Kravitz et al. | |
| 2018/0322148 A1 | 11/2018 | Ishizu | |
| 2019/0091865 A1 | 3/2019 | Amacker et al. | |
| 2019/0259227 A1 | 8/2019 | Oesterling et al. | |
| 2019/0297372 A1 | 9/2019 | Sato et al. | |
| 2019/0374292 A1 | 12/2019 | Barral et al. | |
| 2020/0033879 A1 | 1/2020 | Mushegian et al. | |
| 2020/0379482 A1* | 12/2020 | Park | G05D 1/0287 |
| 2021/0031364 A1 | 2/2021 | Groz | |
| 2021/0111904 A1* | 4/2021 | Ogawa | G09C 1/00 |
| 2021/0111907 A1* | 4/2021 | Juma | H04L 9/3268 |
| 2021/0251720 A1* | 8/2021 | Jhaveri | G06K 19/0705 |
| 2021/0263754 A1 | 8/2021 | Cohen et al. | |
| 2022/0234207 A1 | 7/2022 | Pekarek-Kostka et al. | |
| 2022/0342976 A1* | 10/2022 | Stoyanov | G06F 21/41 |
| 2022/0414088 A1 | 12/2022 | Krishnan et al. | |
| 2023/0009739 A1* | 1/2023 | Ponnuswamy | H04L 9/3213 |
| 2023/0131458 A1 | 4/2023 | Isonni et al. | |
| 2023/0153416 A1* | 5/2023 | Sanchez | G06F 21/36 |
| | | | 726/9 |
| 2023/0254111 A1* | 8/2023 | Olsen | H04L 9/006 |
| | | | 713/150 |
| 2023/0262045 A1* | 8/2023 | Ahokas | H04L 63/0807 |
| | | | 726/6 |
| 2023/0278192 A1 | 9/2023 | Dellon | |
| 2023/0353640 A1 | 11/2023 | Horowitz et al. | |
| 2023/0415340 A1 | 12/2023 | Kaehler et al. | |
| 2024/0031354 A1 | 1/2024 | Horowitz et al. | |
| 2024/0061406 A1 | 2/2024 | Horowitz et al. | |
| 2024/0273411 A1* | 8/2024 | Mueck | H04L 9/3263 |

OTHER PUBLICATIONS

Saurav Malani et al., Certificate-Based Anonymous Device Access Control Scheme for IoT Environment, Dec. 2019, IEEE, vol. 6, Issue: 6, pp. 9762-9773. (Year: 2019).*

Bjoern Matthias et al., Safety of Collaborative Industrial Robots, Jul. 7, 2011, IEEE, pp. 1-6. (Year: 2011).*

Debiao Lu et al., Methods for Certification of GNSS-based Safe Vehicle Localisation in Driving Assistance Systems, Apr. 7, 2016, IEEE, pp. 226-231. (Year: 2016).*

"DroneDeploy", Apr. 22, 2020, https://twitter.com/dronedeploy/status/1252944001960947712.

"Fleet Operation Workspace Core Integration Toolkit", User's Manual 1637-E-03, Omron, copyright 2022, first downloaded Jun. 5, 2023.

"How Does SSL work? | SSL certificates and TLS", Cloudfare, https://www.cloudflare.com/learning/ssl/how-does-ssl-work/, first downloaded Jun. 5, 2023.

"Services—ROS Wiki", first downloaded Jan. 19, 2023, http://wiki.ros.org/Services.

"Welcome to RTCBot's documentation!", RTCBot, first downloaded Jan. 19, 2023, https://rtcbot.readthedocs.io/en/latest/.

Horowitz, Eliot , et al., "Device Control System and Method", U.S. Appl. No. 18/138,963, filed Apr. 25, 2023.

Horowitz, Eliot , et al., "Fleet Management System and Method", U.S. Appl. No. 18/224,785, filed Jul. 21, 2023.

Horowitz, Eliot , et al., "Robot Configuration System and Method", U.S. Appl. No. 18/386,045, filed Nov. 1, 2023.

Lu, Debiao , et al., "Methods for Certification of GNSS-based Safe Vehicle Localisation in Driving Assistance Systems,", Apr. 7, 2016, IEEE, pp. 226-231. (Year: 2016).

Malani, Saurav , et al., "ertificate-Based Anonymous Device Access Control Scheme for IoT Environment", Dec. 2019, IEEE, vol. 6, Issue: 6, pp. 9762-9773. (Year: 2019).

Malykhin, Denys , "Scout. WebRTC controlled robot", Sep. 6, 2021, Hackster.io, https://www.hackster.io/malykhind/scout-webrtc-controlled-robot-bae376.

Matthias, Bjoern , et al., "Safety of Collaborative Industrial Robots", Jul. 7, 2011, IEEE, pp. 1-6. (Year: 2011).

Takada, May , et al., "An Experimental Analysis on Latency Improvement of Cloud-based Fleet Management System", Dec. 2014 , ACM, pp. 505-506. (Year: 2014).

* cited by examiner

S100 — Determining device information

S200 — Sending information to the device

S300 — Operating the device based on the information

Fleet management system

FMS

Device client

RDK (golang)

```
1    package main
2
3    import (
4      "context"
5
6      "github.com/edaniels/golog"
7      "go.viam.com/rdk/grpc/client"
8      "go.viam.com/rdk/utils"
9      "go.viam.com/utils/rpc"
10   )
11
12   func main() {
13     logger :- golog.NewDevelopmentLogger("client")
14     robot, err :- client.New(
15         contect.Background(),
16         "Robot1-main.k9uufsmfup.viam.cloud",
17         logger,
18         client.WithDialOptions(rpc.WithCredentials(rpc.Credentials{
19             Type:    utils.CredentialsTypeRobotLocationSecret,
20             Payload: "99gwyhkcxm7jvfqu138bcb09ebyx59r2kg6iouffvy7w4aal",
21         })),
22     )
23     if err !- nil {
24       logger.Fatal(err)
25     }
26     defer robot.Close(context.Background())
27     logger.Info("Resources:")
28     logger.Info(robot.ResourceNames())
29   }
30
```

FIGURE 13A

RDK Remote Config

```
1    {
2      "remotes": [
3        {
4          "name": "Robot1-main",
5          "address": "Robot1-main.k9uufsmfup.viam.cloud",
6          "secret": "99gwyhkcxm7jvfqu138bcb09ebyx59r2kg6iouffvy7w4aal"
7        }
8      ]
9    }
10
```

FIGURE 13B

Python SDK (GitHub)

```
 1    import asyncio
 2
 3    from viam.robot.client import RobotClient
 4    from viam.rpc.dial import Credentials, DialOpttions
 5
 6    async def client():
 7      creds - Credentials(
 8          type-'robot-location-secret',
 9          payload-'99gwyhkcxm7jvfqul38bcb09ebyx59r2kg6iouffvy7w4aal')
10      opts - RobotClient.Options(
11          refresh_interval-0,
12          dial_options-DialOptions(credentials-creds)
13      )
14      async with await RobotClient.at_address(
15          'Robot1-main.k9uufsmfup.local.viam.cloud:8080',
16          opts) as robot:
17            print('Resources:')
18            print(robot.resource_names)
19
20    if __name__ -- '__main__':
21      asyncio.run(client())
22
```

FIGURE 13C

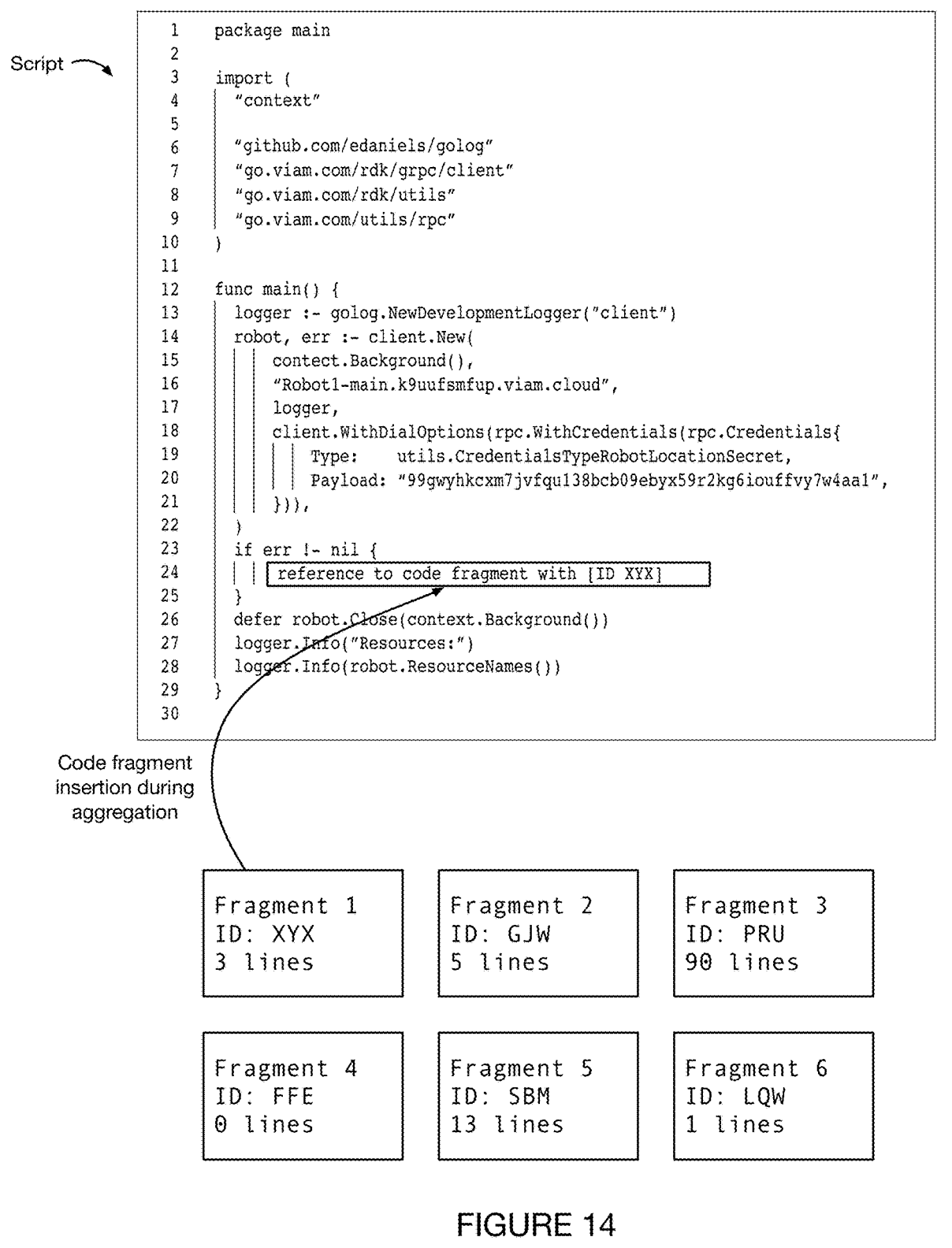

Script →

```
1    package main
2
3    import (
4        "context"
5
6        "github.com/edaniels/golog"
7        "go.viam.com/rdk/grpc/client"
8        "go.viam.com/rdk/utils"
9        "go.viam.com/utils/rpc"
10   )
11
12   func main() {
13       logger :- golog.NewDevelopmentLogger("client")
14       robot, err :- client.New(
15           contect.Background(),
16           "Robot1-main.k9uufsmfup.viam.cloud",
17           logger,
18           client.WithDialOptions(rpc.WithCredentials(rpc.Credentials{
19               Type:    utils.CredentialsTypeRobotLocationSecret,
20               Payload: "99gwyhkcxm7jvfqu138bcb09ebyx59r2kg6iouffvy7w4aa1",
21           })),
22       )
23       if err !- nil {
24           | reference to code fragment with [ID XYX] |
25       }
26       defer robot.Close(context.Background())
27       logger.Info("Resources:")
28       logger.Info(robot.ResourceNames())
29   }
30
```

Code fragment
insertion during
aggregation

```
┌─────────────────┐   ┌─────────────────┐   ┌─────────────────┐
│ Fragment 1      │   │ Fragment 2      │   │ Fragment 3      │
│ ID: XYX         │   │ ID: GJW         │   │ ID: PRU         │
│ 3 lines         │   │ 5 lines         │   │ 90 lines        │
└─────────────────┘   └─────────────────┘   └─────────────────┘

┌─────────────────┐   ┌─────────────────┐   ┌─────────────────┐
│ Fragment 4      │   │ Fragment 5      │   │ Fragment 6      │
│ ID: FFE         │   │ ID: SBM         │   │ ID: LQW         │
│ 0 lines         │   │ 13 lines        │   │ 1 lines         │
└─────────────────┘   └─────────────────┘   └─────────────────┘
```

FIGURE 14

User device control permissions

Organization user1

Location 1: robot11, robot12, robot13

Location 2: robot21, robot23, robot25, robot27 user2

Location 1: robot11, robot15, robot16

Location 2: robot21, robot23 user3

Location 1: none

Location 2: all

S200

Device
information

S200

Device
information

Certificate-permissions correspondence

| Certificate | Proves that this robot... |
|---|---|
| CertificateF1 | ...is a member of fleet 1 |
| CertificateG | ...can relay updates to robots in fleet 2 |
| ⋮ | ⋮ |
| CertificateN | ...can send data to robots In fleet 1 |

S100

S100

FLEET MANAGEMENT SYSTEM AND METHOD

CROSS-REFERENCE TO RELATED APPLICATIONS

This application is a continuation of U.S. application Ser. No. 18/224,785, filed 21 Jul. 2023, which claims the benefit of U.S. Provisional Application No. 63/391,673 filed 22 Jul. 2022 and U.S. Provisional Application No. 63/406,062 filed 13 Sep. 2022, each of which is incorporated in its entirety by this reference.

This application incorporates U.S. application Ser. No. 18/138,963 filed 25 Apr. 2023 in its entirety by this reference.

TECHNICAL FIELD

This invention relates generally to the devices field, and more specifically to a new and useful device fleet management system and method in the devices field.

BRIEF DESCRIPTION OF THE FIGURES

FIGS. 13A, 13B, and 13C are illustrative examples of scripts to connect to a device ("Robot1").

FIG. 14 is an illustrative example of a piece of code implementing fragment references.

DETAILED DESCRIPTION

The following description of the embodiments of the invention is not intended to limit the invention to these embodiments, but rather to enable any person skilled in the art to make and use this invention.

1. Overview

Figure 1:
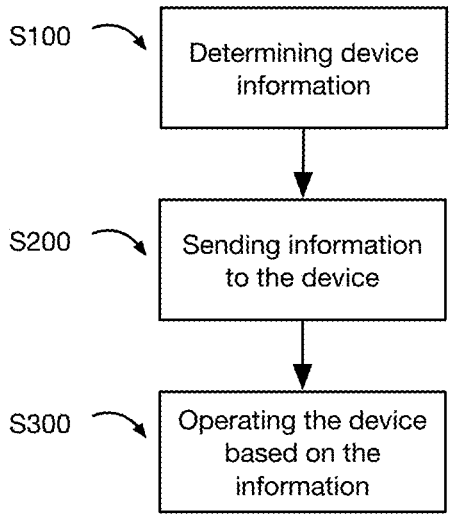
FIG. 1 is a schematic representation of a variant of the fleet management method.

In variants, a fleet management method can include determining information about a device S100; sending information to a device S200, and operating the device according to the information S300 (e.g., example shown in FIG. 1). The fleet management system can function to scalably manage the operation and permissioning of one or more fleets of devices.

In an illustrative example, a fleet operator can configure a set of devices (e.g., robots) within a fleet, using a remote fleet management system (FMS). Devices can then independently (directly or indirectly) connect to a fleet management system (e.g., on a predetermined schedule, when a remote connection is available, etc.), wherein the FMS can provide updates to the device (e.g., after FMS verification of the device, such as by using a secret shared between the device and FMS). Devices can control themselves (e.g., independent of the FMS) based on the updates. The updates can include: scripts, credentials, configurations, and/or other device information. In examples, the certificates can be provided by a third party certificate issuer and be associated with different sets of permissions, or be otherwise configured. In examples, the device can use valid certificates to: authorize and/or authenticate interactions and/or functionalities, validate themselves with other devices prior to establishing communication channels with the other devices, enable usage of a given software module, and/or enable other interactions. In an illustrative example, the device can authenticate itself to another endpoint using a cryptographic protocol, such as TLS or SSL. In this illustrative example, the device can function as a server, wherein the endpoint functions as a client when performing the verification process.

However, the fleet management system can be otherwise configured and/or be otherwise used.

2. Technical Advantages

Variants of the technology can confer one or more advantages over conventional technologies. First, in variants, devices can control the update schedule, and/or control when the device connects to the fleet management system (FMS). This can enable the FMS to manage more devices, since the FMS no longer needs to maintain connections with all devices, and no longer needs to re-attempt connection when device connection fails.

This can also remove the FMS as a single point of failure for attacks. Furthermore, because devices within a fleet can asynchronously request updates from the FMS, updates can be gradually rolled out to the entire fleet, precluding a corrupted update from adversely affecting the entire fleet at the same time.

Second, variants of the technology can make fleet maintenance easier. In variants, the FMS can store a single set of device information (e.g., a configuration file, etc.) for multiple devices in a fleet, which reduces the amount of memory required to maintain multiple devices. By reducing the amount of information stored in the FMS, the invention can improve the performance of the FMS computing system. In variants, the device scripts can use identifiers for script fragments, to reference reusable code blocks, wherein the code blocks can be imported into the code during compilation or execution. This can improve the performance of the FMS by reducing the amount of information that needs to be stored at a given time.

In variants, device information can incorporate third party modules authored by third parties and/or maintained outside of the FMS. This can enable third-party developers to provide additional functionality to devices. In variants, updates to third party modules can be sent to the device from the third party or through the FMS when the device requests the next update.

Third, variants of the technology can improve security and reliability. For example, each device can store and use one or more credentials, each associated with different interactions, permissions, and/or capabilities, to authenticate itself when interacting with other entities (another device, FMS, user device, etc.). This enables devices to operate securely on and offline (e.g., independent of whether the device is connected to the FMS). These credentials can automatically expire, which can disable the associated device interactions until a new credential is obtained (e.g., from the FMS). This can prevent devices from operating and/or interacting with other devices based on outdated device operation instructions (e.g., configuration files, scripts, etc.), by causing the device to periodically request updates from the FMS. In other examples, each device can additionally or alternatively use automatically expiring configuration files, scripts, and/or other operation instructions, wherein device functionalities can be disabled once the operation instructions expire. This can also enable the device to operate offline, without a persistent connection to the FMS.

In variants, credentials can be shared between members of a fleet. This can minimize the number of credentials that are maintained and can enable direct authentication between devices. In examples, different credentials can be assigned to different subsets of devices within a fleet (e.g., distinct or overlapping subsets), wherein the different credentials can confer different permissions and/or enable different interactions.

In variants, communication channels can be primarily peer-to-peer. This lowers the risk of eavesdropping, man-in-the-middle attacks, and/or other attacks.

Fourth, variants of the technology can improve flexibility and decrease operating resources. With devices operating independently from the FMS, devices can save energy and processing power which would otherwise be spent communicating with the FMS to enable simple tasks. Similarly, the FMS can save power and can process fewer operation calls. Devices can also operate over wider geographies and different environments due to their lack of need for continuous FMS connectivity.

However, variants of the technology can confer other benefits over conventional robotics systems.

3. System

In variants, the system can include a fleet management system (FMS), a set of devices, a set of endpoints, and/or other components. The system functions to manage the security, operation, and/or other aspects of one or more fleets of devices (e.g., robots).

Figure 8:
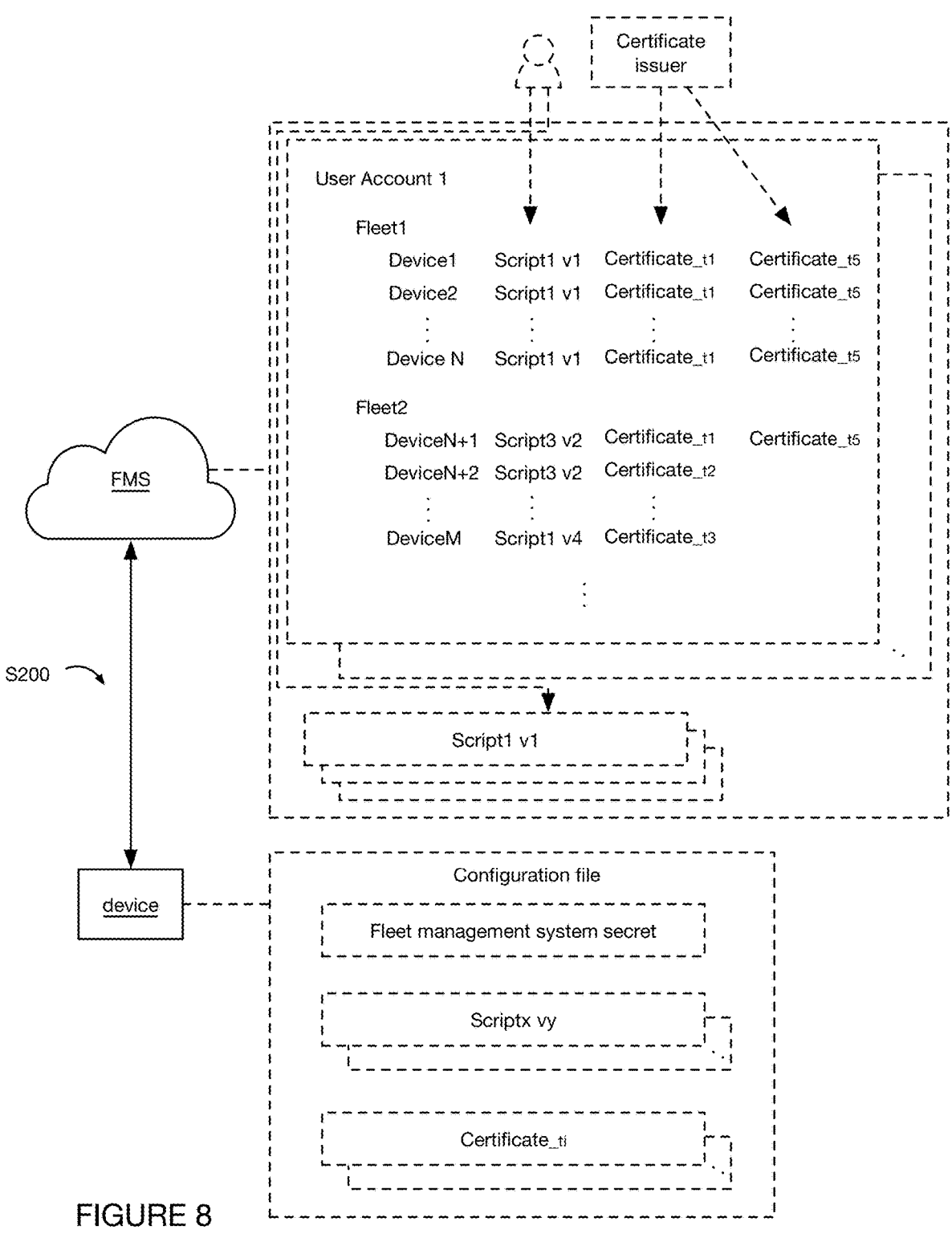
FIG. 8 is a schematic representation of an illustrative example of the fleet management system, a device, and the information stored by each.

A fleet management system (FMS) functions as a centralized coordination system and data repository. The FMS can store and provide updated instructions to devices. The FMS can generate, obtain, distribute, and/or track device information for devices, and optionally for endpoints (e.g., example shown in FIG. 8). In variants, the FMS can trigger actions based on device events, or perform other functionalities.

The system can include one or more FMSs, wherein different FMSs can be specific to different fleets, entities, and/or otherwise differentiated. A given FMS can be shared by one or more fleets, or be specific to a fleet. A given FMS can be shared by multiple entities (e.g., companies, users, etc.) or be specific to an entity.

The FMS can be a remote computing system (e.g., a cloud system), local computing system (e.g., an on-prem system), a centralized system, a remote system, and/or have any other suitable configuration. The FMS is preferably identified by a single FMS identifier (e.g., URL, IP address, etc.), but can alternatively be identified by multiple FMS identifiers, or be unidentified. In variants, each device can include the FMS identifier within the device's operation instructions (e.g., configuration file, hardcoded within the device software, etc.), wherein the device can use the FMS identifier to connect to the FMS.

Figure 12:
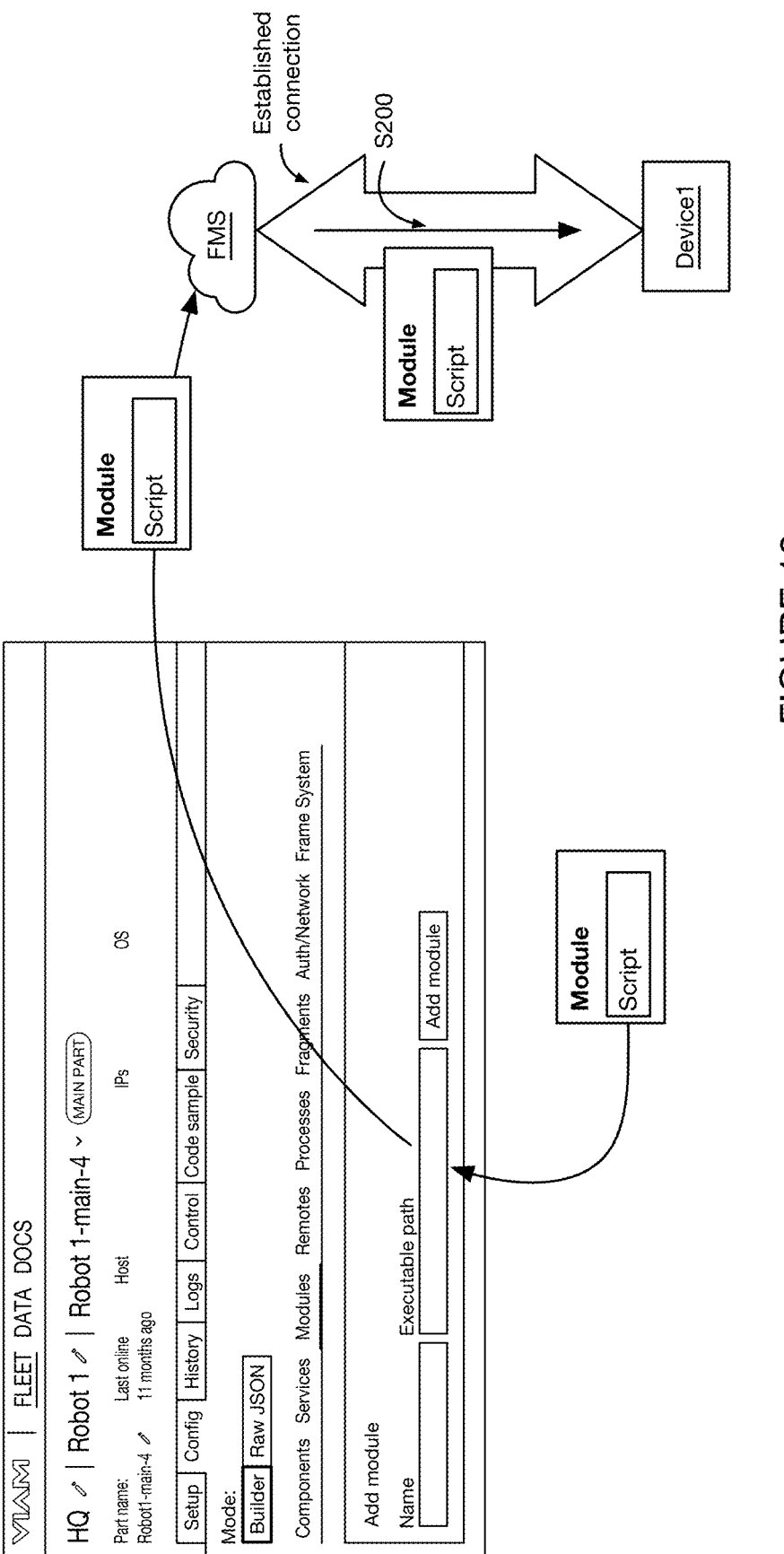
FIG. 12 is an illustrative example of updating a device with a user-generated script.

In a first variant, the FMS does not control device connection to the FMS. In this variant, the FMS only receives data and responds to requests from devices, such as update requests, forwarding requests, and/or other requests. In examples, the FMS can function as a server (e.g., an RPC server). In an illustrative example, the FMS receives a fleet update from a user, waits for an update request from a device or set of devices (e.g., initiated by the respective device), and sends a fleet update to the device in response to receiving the request (e.g., see FIG. 12). The device can then install the update and optionally forward the update to other devices which may or may not have a direct FMS connection.

In a second variant, the FMS can control device connection. In this variant, the FMS periodically attempts to connect to devices and pushes information to devices. In this variant, the FMS can track the device connection information and attempt to connect to the device upon satisfaction of one or more conditions. The set of conditions can include: expiration of a waiting period, receipt of updated device information, user instructions to update, and/or any other suitable condition.

In a third variant, the FMS can receive data from the devices, and can optionally execute actions based on said data. Examples of data received from the devices can include: device state, device outputs (e.g., maps, measurements, signals, etc.), and/or other device data. Examples of actions executed by the FMS can include: executing webhook triggers, triggering callbacks, sending messages (texts, API calls, user notifications, etc.), accessing a predetermined URI, executing code, publishing information, updating device information, and/or any other suitable action. Actions (and triggering data values) can be specified by the fleet authority, be default actions, be requested by the device, or be otherwise determined. Additionally or alternatively, the FMS can track device resource consumption (e.g., data usage, FMS memory usage, etc.), device information (e.g., artifacts, usage, sensor measurements, etc.), and/or other information, wherein the FMS can additionally or alternatively analyze the information (e.g., summarize the information; derive patterns from the information; learn from the information, such as by training one or more machine learning modules using multimodal sensor data from the device; etc.), provide the information to a user (e.g., the fleet authority), bill the user and/or a customer based on the information (e.g., passthrough billing), and/or otherwise use the information.

Figure 10:
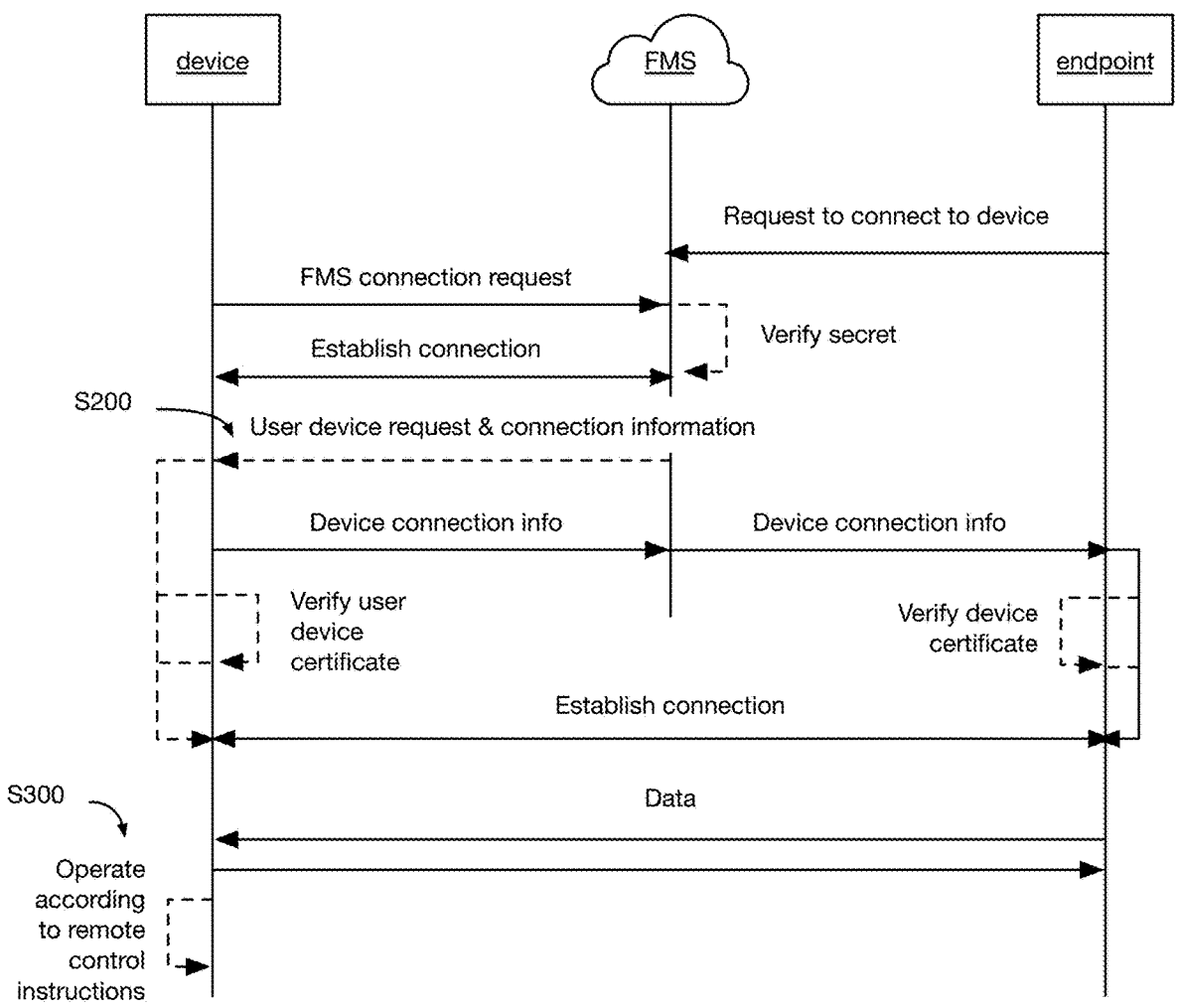
FIG. 10 is a schematic representation of an example of establishing a connection channel between a device and an endpoint.

In variants, the FMS does not directly control the device. For example, in these variants, the FMS does not generate or issue device commands, does not relay data from other devices, does not control the device update schedule, and/or is otherwise limited. In examples, the FMS functionality can be limited to responding to device requests (e.g., sending configurations and/or other data responsive to a device request), forwarding connection requests and/or associated information to the devices (e.g., example shown in FIG. 10), receiving data from the device and/or other endpoints, and/or controlling device security (e.g., by sending new certificates to the device). In a specific example, the FMS functionality can be limited to functioning as an RPC server. Alternatively, the FMS can directly control the device, be capable of additional functionalities, or be otherwise configured. In an illustrative example, the FMS can receive a fleet update from a user, wait for an update request from a device within the fleet, then provide the fleet update to the device (e.g., in a response to the update request). In this illustrative example, the FMS can provide the fleet update to each device individually (e.g., wait for each device to independently connect to the FMS), provide the fleet update to a subset of the devices in the fleet, wherein said device subset can subsequently provide the fleet update to other devices in the fleet (e.g., via a distributed device mesh, independent of the FMS), or otherwise provide the fleet update to the one or more devices within the fleet. However, updates can be otherwise provided to devices within the fleet.

The FMS can additionally or alternatively register devices. Device registration can be user initiated, device-initiated (e.g., devices automatically register with the FMS upon startup/initial code execution), or initiated through any other suitable process. The FMS can automatically determine device information for the device upon registration. In an example, the FMS can automatically generate a personal secret for the device and assign a certificate to the device.

Figure 11:
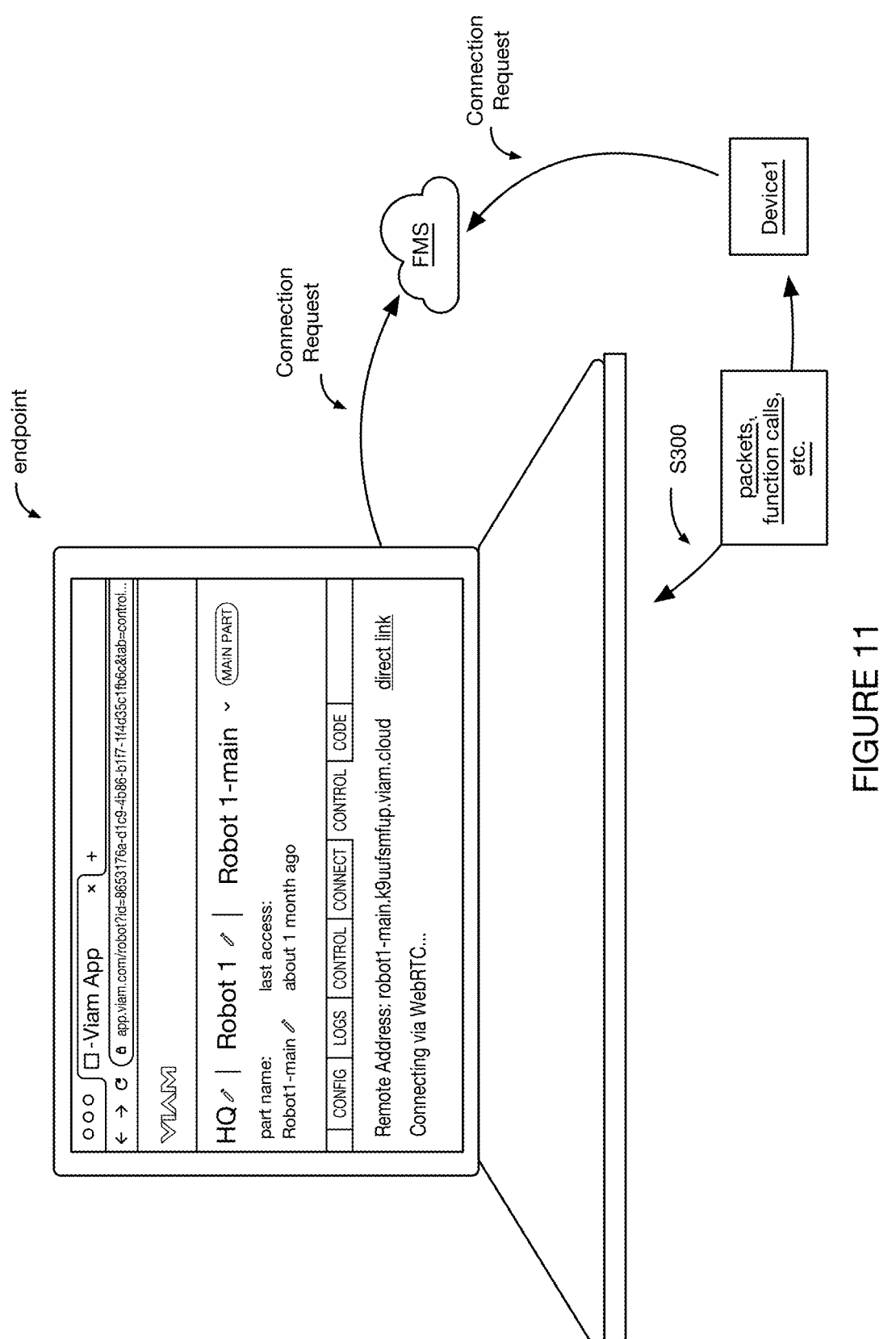
FIG. 11 is an illustrative example of a user device remotely connecting to a device.

The FMS can additionally or alternatively connect the device with one or more endpoints. Endpoints can include: other devices within the same fleet, other devices in other fleets, user devices, third-party systems (e.g., servers, databases, etc.), and/or any other suitable endpoint. In a first example, the FMS facilitates communication channel establishment between different endpoints (e.g., devices, web browsers, etc.), but may not be involved in the communication channel (e.g., packet transfer) itself (e.g., example shown in FIG. 11). In an illustrative example, data from other clients (e.g., devices, user devices) are not relayed through the FMS. Alternatively, the FMS can receive and forward data (e.g., measurements, states, etc.). In a second example, the FMS can function as an intermediary, wherein data is sent from one party (e.g., endpoint or device) to the FMS, the FMS can optionally validate the data, and the FMS can send the data to the second party. However, the FMS can otherwise facilitate inter-endpoint communication.

The FMS can manage one or more fleets for one or more organizations.

An organization can be associated with a group of fleets, a single fleet, a single fleet with multiple sub-fleets (wherein devices are members of an additional, smaller fleet made of devices of the same parent fleet), or can be made of any other grouping of devices. Organizations function to group devices controlled by a single fleet authority or set of fleet authorities. In a specific example, a company may operate an organization, which contains all of the devices owned by the company.

The fleet authority is preferably an entity (e.g., user, user set, etc.) that owns or operates the physical devices within a fleet, but can alternatively be any other suitable entity with any other relationship with the devices. A fleet authority can be associated with one or more fleets of devices. The fleet authority can be associated with one or more user accounts (e.g., for one or more users). Each user account can be associated with one or more permissions and/or permission levels. Examples of permissions can include: device code updates, remote control, device data access, device information updates, device addition and/or removal to a given fleet, fleet control (e.g., start, stop, update, etc.), administrative permissions (e.g., authority to add or remove users, authority to add or remove fleet permissions, etc.), and/or other permissions. Different users can have different sets of permissions over different fleets or subfleets within a given fleet authority. Additionally or alternatively, different fleet authorities can share permissions (e.g., control) over one or more fleets or devices therein. The permissions can be set by an administrator account, a main account, and/or by any other suitable account. However, the fleet authority can be otherwise defined or configured.

In examples, auth.State can be the source of truth about who an entity is and what resources they are authorized to access/manipulate. This is represented by organizations they are a part of, what specific robots they are authorized to access, as well as an associated secret (of a robot part). In these examples, almost every action on the system can involve either looking up data or manipulating data. As such, the best place to do authorization can be on every data access and manipulation. This happens in auth.permissionedData which implements the data.Data interface and wraps a MongoDB based data.Data. auth.permissionedData can perform all authorization checks by consulting the auth.State present in the context. Some methods don't require an explicit authorization check in code. RobotPartByIDAndSecret, for example, is implicitly authorized because if a document can be found by supplying both unique robot part ID and secret, clearly the use is authenticated and authorized. In fact, the gRPC based robot secret rpc.AuthHandler uses this to be able to use auth.permissionedData and look up the part and then build an auth.State where it is logged in and has access to the org and robot part. There are, however, some areas where authorization can still be done where data doesn't need to be explicitly accessed. In these cases, the system can explicitly attempt to access data being referred to in order to invoke authorization primitives. One place where this happens is the WebRTC signaling server. The system wraps the provided rpc.WebRTCSignalingServer with a server.authorizingWebRTCSignalingServer where for every host mentioned that wishes to either make an offer to start a connection or answer said offer, the system can do a lookup for the associated robot part which invokes authorization for that part. Currently, a robot part can connect to any other robot part in the same organization.

However, the fleet authority can include any other fleet managing entity.

Fleets function as a higher-level abstraction encompassing one or more devices, which enables multiple devices to be easily managed as a singular unit.

A fleet can manage: device membership within the fleet, device membership within a subfleet of the fleet, device information for one or more devices within the fleet, inter-device relationships, device data (e.g., data generated by the device), fleet data (e.g., information about fleet performance, fleet statistics, fleet state, etc.), and/or any other suitable fleet information.

Each fleet can include one or more devices. The fleet can include devices that are related by physical location, virtual connections, semantic clustering, manual assignment, formed ad hoc (e.g., based on mutual connection), or otherwise related. Devices within a fleet can be determined by: shared security credentials (e.g., certificates, secrets, etc.), membership in a fleet list, shared parameters (e.g., local area network, location, model, type, etc.), and/or otherwise determined.

Each device is preferably associated with a single fleet, but can alternatively be associated with multiple fleets. Devices in the fleet may be interchangeable, identical but identity-differentiable, unique, or otherwise related. Fleets can have overlapping members or be mutually distinct. The devices (and/or components that the devices are made from) within a fleet can be from the same or different manufacturer.

Figure 15:
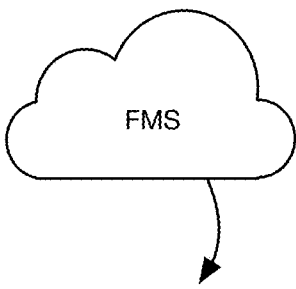
FIG. 15 is an illustrative example of varying device control permissions between users communicating directly with devices.

The fleet may be organized uniformly (e.g., in a flat organizational structure), hierarchically, with overlapping subsets of devices, or with any other suitable structure. In a first variant, all devices in the fleet are organized in a uniform manner, have equivalent communications privileges with the FMS, and/or have similar functions and/or permissions. In a second variant, when a fleet is organized in a hierarchical manner, child devices (and/or child subsets) can inherit permissions from, be controlled by, share device information (e.g., security credentials) with, and/or be otherwise related to the parent devices, and optionally have different permissions from and/or cannot control sibling or parent devices. In an illustrative example, a fleet can include primary and secondary devices, wherein the primary devices can control a set of secondary devices. In specific examples, the primary devices can communicate with the FMS, and send secondary device updates, received from the FMS, to the secondary devices. In a second variant, fleets can be split into different device sets (e.g., "subfleets"). Device sets can be discrete or overlapping (e.g., wholly or partially); example shown in FIG. 18. Different device sets can have different user privileges, different interaction privileges, and other suitable differing privileges. (e.g., example shown in FIG. 15).

Devices within a fleet can communicate with one another directly or indirectly according to a communication protocol which may be the same as or different from the communication protocol used for device-FMS communication. Inter-device communication can occur over a local network (for example, Wi-Fi, Bluetooth, Zigbee, etc.), hard wired connections, light and sound, and/or some means. Alternatively devices in a fleet may be linked through the FMS.

Devices may be aware of their existence in the fleet, or not have knowledge of fleet membership. In a first variant, devices do not keep an internal record of fleet membership, wherein the FMS tracks fleet membership. In a second variant, devices may keep an internal certificate which proves their existence in the fleet but have no other knowledge of the fleet or other devices in the fleet.

The FMS can function to store fleet information. The fleet information stored by the FMS can enable a fleet authority to manage a fleet of devices, either independently or as a set.

Fleet information can be: determined by the fleet authority, learned (e.g., from device-generated data), automatically determined, retrieved from a third party (e.g., responsive to a third party module update, etc.), and/or otherwise determined. Fleet data can be determined for the entire fleet (e.g., as a batch), determined on a device-by-device basis, determined for each subset, and/or otherwise determined. Fleet information can include: a fleet identifier (e.g., location identifier, wherein a location represents a grouping of devices in a specific physical location or any other suitable group type, the fleet name, etc.); a set of device identifiers identifying the devices within the fleet; the associated fleet authority; the fleet size; the master device within the fleet; inter-endpoint configurations; device information (e.g., fleetwide device information, such as shared scripts, certificates, etc.; device-specific information, such as device-specific scripts, certificates, etc.; etc.); and/or any other suitable information (e.g., example shown in FIG. 8).

Inter-endpoint configurations function to define inter-endpoint permissions, such as which endpoints (e.g., robots, user accounts, clients, etc.) are authorized to communicate with each other, what data the endpoints are authorized to share (e.g., which requests and/or which requesters to respond to), connection schedules, whitelists (e.g., which endpoints a given endpoint can connect to and/or respond to), blacklists (e.g., which endpoints a given endpoint cannot connect to and/or respond to), and/or any other information characterizing how different endpoints can interact with each other. The inter-endpoint configurations can be: determined by default, determined manually, learned, and/or otherwise determined. The inter-endpoint configurations can be defined for: a fleet, each individual device, for each individual endpoint or client, and/or for any group of entities. The inter-endpoint configuration can be stored and/or enforced by: the FMS, each individual client (e.g., each individual device, each individual user device, etc.), and/or by any other suitable system.

Device information functions to control device operation and security.

Each device is preferably associated with a set of device information at any given time. Each device can be concurrently associated with a single set of device information, multiple sets of device information (e.g., different versions of device information), and/or any other suitable number of device information. Each device preferably stores a single set of device information (e.g., independent of whether the device is associated with one or more sets of device information), but can alternatively store multiple sets of device information. In the latter situation, the device can preferentially use: the most recent device information version, the device information associated with the operating context, and/or otherwise determine the device information version to use.

Devices within a fleet preferably share the same device information, but can alternatively share portions of the device information (e.g., example shown in FIG. 18), have different device information, and/or have otherwise-related device information. For example, devices within a fleet preferably share the same device configuration (e.g., the same fleetwide configuration), security credentials, and/or operating instructions (e.g., fleet script), but can alternatively have different device configurations, sets of security credentials, operating instructions, and/or other device information. Devices can additionally or alternatively share information with other endpoints, such as user devices, third-party services, auxiliary devices (e.g., that the devices interact with during operation), and/or other endpoints.

Device information can be stored on the FMS, on the device only, on both the device and the FMS, or otherwise stored. Device information can expire (e.g., periodically, responsive to occurrence of an event, etc.), be persistent, and/or have other temporal parameters. For example, security credentials, configuration files, and/or other device information can expire after a limited time. Device information can be verified, provided by an authenticated or trusted source, and/or otherwise determined. Device information can be provided by: users, other devices, other FMS, third parties, and/or other suitable sources.

Examples of device information can include a device identifier, a device configuration, a set of security credentials, scripts, and any other suitable type of information.

The device identifier functions to uniquely identify the device. The device identifier can include: a personal secret (e.g., part of the device's set of security credentials), an address, a manufacturer identifier, and/or any other suitable identifier. The device identifier is preferably stored by the FMS, optionally in association with the device information (e.g., the current device information, a history of device information, valid and invalid device information, etc.), fleet information for the fleet(s) encompassing the device, and/or other data.

Figure 21:
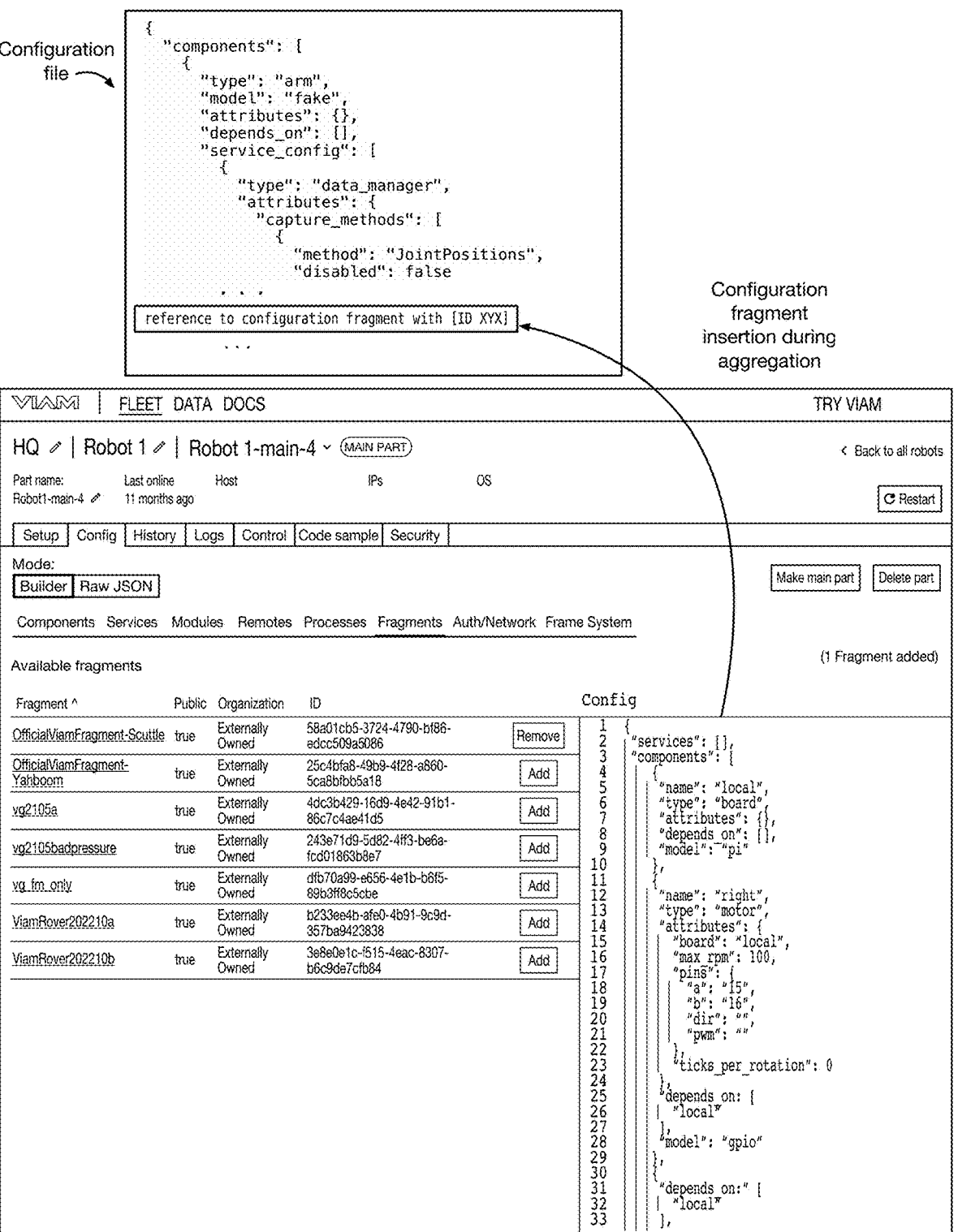
FIG. 21 is an illustrative example of a configuration referencing a configuration fragment.

The device information can include a device configuration, which functions to define the device parts, element relationships, inter-device relationships, calibration data, initialization data, and/or any other suitable device parameter for a device. The device configuration can also optionally include initialization information, operation information, update information, and/or any other suitable information; alternatively, this information can be included in the device scripts or other device information instead. The device configurations can be associated with a device identifier or otherwise associated with the device. The device configuration can be or can include: a configuration for a device (e.g., a set of device parts), a single device part, a part process, a resource (e.g., task resource, component resource, etc.), and/or any other suitable device element. The device configurations can be shared across devices (e.g., within the same fleet), or be specific to each device (e.g., wherein different devices have different device configurations). In a variant, a device configuration can include (e.g., reference) one or more configuration fragments (e.g., example shown in FIG. 21). In operation, the configuration fragments can be merged into the device configuration before device configuration transmission to the device. Each configuration fragment can be associated with a specific part, process, part group, protocol, model, or any other suitable element of a device configuration, and be declarative in what is being provided to the device. For example, when different camera makes and models are used for different devices in the same fleet, the camera section of the respective configuration files can reference the configuration fragment for the device's specific camera make and model, wherein configuration information for the device's specific camera make and model can be merged into the final configuration before transmission to and/or use by the device. The device configurations are preferably stored on the FMS (e.g., wherein the FMS functions as the source of truth for the device configurations for each device), wherein a copy is stored on each respective device. Alternatively, the devices' configurations can be stored only on the device, only on the FMS, only on a user device, and/or otherwise stored. Device configurations can be stored in a configuration file or any other suitable file.

The device part information within the device configuration can include: a part identifier (e.g., semantic identifier), part dependencies, part logic (e.g., for execution by the part), resource parameters, remote endpoints (e.g., fleet management system endpoint, client endpoints, peer identifiers, addresses, URIs, etc.), and/or other part information. In an example, the device part information can include an identifier for the FMS, which defines which FMS should be used by the device (and/or device part) to obtain device information updates.

The element relationships within the device configuration can include inter-part relationships, part-resource relationships, inter-resource relationships, and/or any other relationship between different device elements (e.g., devices, device parts, device resources, etc.).

Inter-part relationships can include part dependencies, part hierarchies, calibration matrices, connection endpoints & logic, or any other part relationship.

Inter-device relationships can specify which other devices a device can connect to; can specify when and/or how devices can connect, and/or can be other inter-device relationship parameters. For example, the inter-device relationships can include: a fleet identifier, peer device identifiers (e.g., addresses, URIs, semantic identifiers, etc.), device dependencies (e.g., child relationships, parent relationships, etc.) connection logic (e.g., which conditions trigger connection initiation), connection parameters (e.g., which transport layer or communication logic (e.g., which conditions trigger communications between devices, which conditions trigger request generation and transmissions, etc.), and/or other information.

However, the device configurations can include any other suitable information.

The device information can include device scripts, which function to control device operation (e.g., control physical device interaction with the surrounding environment). The device scripts can be determined by a user (e.g., a fleet authority), automatically determined (e.g., learned), and/or otherwise determined. The device scripts are preferably executed locally on the device, but can alternatively be executed remotely from the device (e.g., such as when the device is remotely controlled).

Device scripts can be programs or sequences of instructions that are interpreted by a program (e.g., the processor on the device) (example shown in FIG. 13A, FIG. 13B, and FIG. 13C). Device scripts can be written in one or more protocols or languages. Different devices within the same fleet can share the same or different device scripts. In a first example, devices within the same fleet with different makes and models of the same component (e.g., camera, wheel encoder, etc.) can have the same script (e.g., wherein different code fragments, identified by a fragment identifier, are used to accommodate for differences in the component interface; example shown in FIG. 14). In a second example, devices within the same fleet with different makes and models of the same component (e.g., camera, wheel encoder, etc.) can have the different scripts that accommodate for differences in different component interfaces.

Device scripts can include code; control logic, wherein control logic can include reusable fragments; modular processes; sidecar processes (e.g., supporting processes or services for a primary application, such as the modular process or ML model; sidecar processes can execute in the same or different computing environment), ML models (e.g., neural networks, segmentation models, classifiers, object detectors, foundation models, etc.); arbitrary code; binaries; or other control logic.

In examples, a device script may include "shutoff code," which functions to instruct the device to enter a standby mode, initiate shutdown sequence, and/or otherwise cease operations. Shutoff code can optionally instruct the device to periodically check in with the FMS. Shutoff code can be sent to the device when a predetermined event occurs, be sent as a default set of device instructions (e.g., to be used when a certificate, configuration, primary device script, or other device information expires), be hardcoded into the device, or be otherwise provided. Shutoff code can be executed by the device when a predetermined event occurs (e.g., when a certificate expires, when the device is unable to directly or indirectly connect to the FMS, when the device script expires, when the device configuration expires, when the device information expires, when payment is unconfirmed, etc.), and/or at any other suitable time. In an example, when a fleet authority fails to satisfy a condition (e.g., authentication, payment, etc.), the FMS may send shutoff code to the device and/or not send the updated device information to the device, wherein the device automatically executes the shutoff code when the onboard (out-of-date) device information expires. However, the shutoff code can be otherwise used.

Device scripts can be manually or automatically defined or changed. In a first example, a user (e.g., fleet entity) provides a set of device scripts. In a specific example, the device scripts can reference a code fragment from a set of predefined code fragments (e.g., by referencing the code fragment identifier in the code), wherein the FMS can merge the code fragment into the remainder of the device script prior to transmission to the device.

Figure 19:
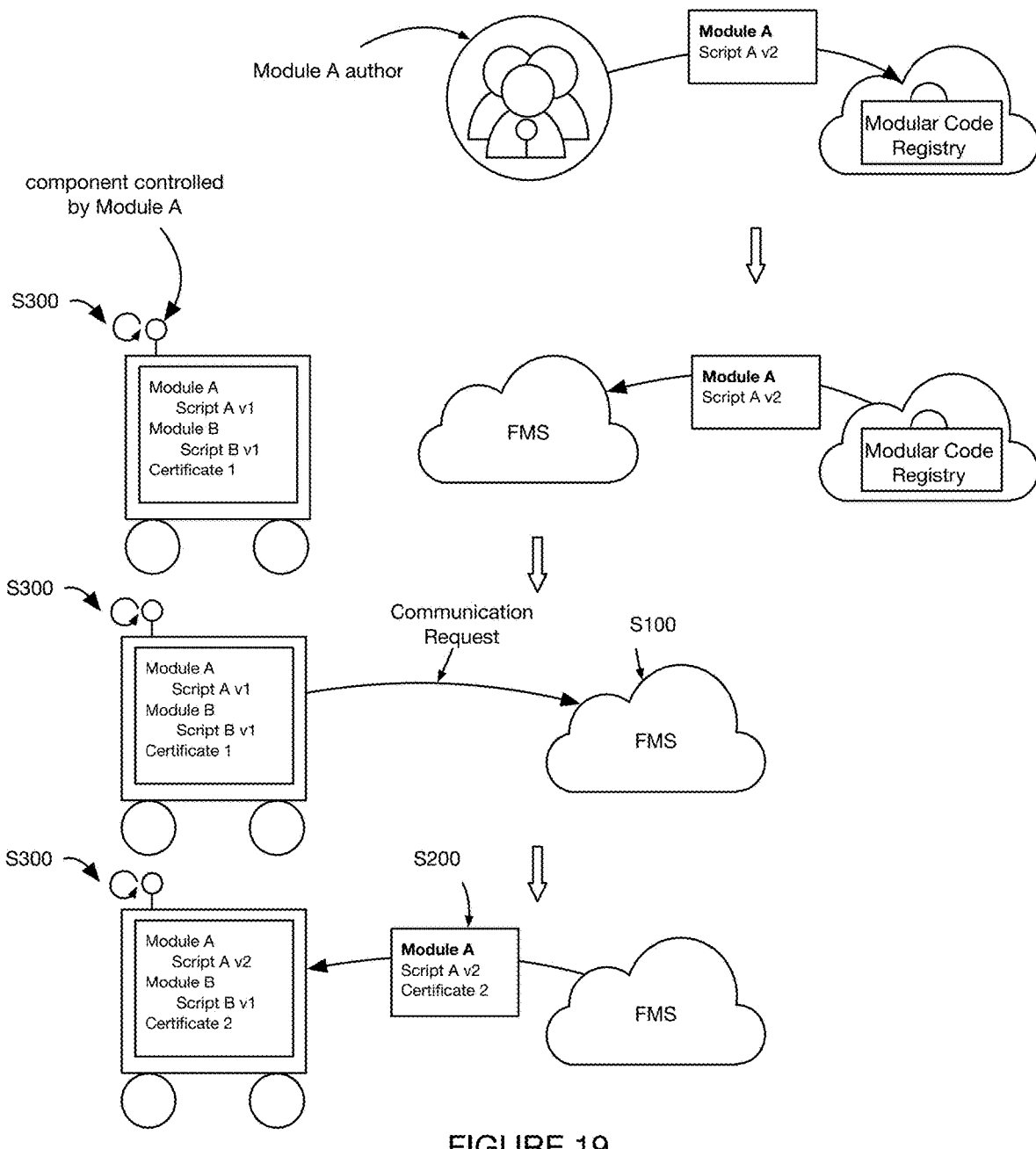
FIG. 19 is an illustrative example of a modular code registry updating scripts on a device.

In a second example, all or a portion of the device script can be provided by a third party (e.g., a third-party software module, a third-party application, etc.); example shown in FIG. 19. Third party modules can include installable code segments downloaded from and maintained by third parties. Third party modules can include code, but may also include data structures, models, and other information. In one embodiment, the third party module contains a package or library which functions to confer additional device functionality and is maintained outside of the FMS (e.g., by a third party author). In an illustrative example, each device in a fleet can use a third party SLAM module for mapping and localization, wherein the SLAM map can be: used locally, shared within the fleet (e.g., only), shared to the third-party system, and/or otherwise used. In variants, modular code can be hierarchical, wherein different third party modules in the hierarchy can be authored by or controlled by different authors. In a specific example, third party modules can "parent" other third party modules, and in order for a third party module to update, it requires permission from entities controlling parent third party modules. In a second specific example, parent third party modules require permission from child third party modules so that child third party module-controlling entities can verify that their code will still work. However, third-party module updates can be otherwise managed.

Third party modules can be obtained from a modular code registry (e.g., purchased from the registry, imported from registry, etc.) (example shown in FIG. 19), be provided by the fleet authority, and/or otherwise obtained. In this example, updates to the third-party software module can be automatically pushed to the device scripts (e.g., with or without validation by the FMS or another entity). Updates to the third party module can be provided to the device during the device information update via the FMS, separate from the device information update via the FMS, and/or at any other suitable time. In an example, a third party pushes an update to the FMS, and the FMS sends the update to the device (e.g., when the device requests an update from the FMS). In a second example, the update is pulled by the FMS when aggregating the device script (e.g., when the device requests an update from the FMS). In a third example, the update is directly sent to the device from the third party (e.g., wherein the device pulls the update from the third party, wherein the third party pushes the update to the device, etc.). However, the update can be otherwise provided.

In variants, different types of updates (e.g., fleet updates, device information updates, third-party updates, etc.) can be controlled by different entities and/or require different permissions; alternatively, different updates can be unpermissioned or all have the same required permissions. In an example, low-impact updates (e.g., aesthetics) can be automatically updated, while high-impact updates (e.g., how security credentials are handled) can require a fleet authority review and authorization before device implementation.

In a third example, the device scripts can be learned (e.g., iteratively updated by a reinforcement learning agent). However, the scripts can be otherwise determined.

Each device is preferably concurrently associated with a single script version, but can alternatively be concurrently associated with multiple script versions (e.g., in the FMS, stored on the device). The multiple script versions can be associated with different timeframes, but can additionally or alternatively be associated with different: components, operating contexts, functionalities (e.g., SLAM, calibration, etc.), and/or otherwise differentiated. In an illustrative example, each device within a fleet can include a plurality of scripts, a subset of which are testing scripts (e.g., debugging scripts). The testing scripts can be executed by the devices while in testing mode, and not executed by the devices when not in testing mode.

Each fleet can be concurrently associated with one or more versions of a device script. In an illustrative example, different subsets of a fleet (e.g., subfleets) can contemporaneously execute different versions of the device script to test the different script versions. In variants, the results of the testing can be used to select a script version for runtime use. In a second illustrative example, different device subsets of a fleet can be associated with different component makes and/or models (e.g., have different imaging system providers), wherein the different device subsets can be associated with different device script versions. In this example, each script version can embody the same overall operation logic but include different code implementations to accommodate for the different components or parts. In an illustrative example, the different device script versions can be generated by inserting different code fragments (e.g., for the component's make and/or model) for a given fragment identifier in the shared device script (e.g., fleet device script); be manually generated; and/or be otherwise generated.

However, the device scripts can be otherwise configured.

The device information can include security credentials, which function to ensure device security. In examples, this can include: ensuring that the operation instructions are provided by a trusted source, ensuring that the device has permissions for a given interaction (e.g., with other endpoints, devices, etc.), securing device communications (e.g., through authentication, encryption, validation, etc.), authenticating the device or other devices, and/or otherwise secure participation within the fleet.

In a first example, the security credentials can be used by the device to authenticate itself to another endpoint (e.g., other device) before endpoint interaction, without sending secrets (e.g., using an SSL or TLS protocol). In this example, the device can function as a server (e.g., TLS server, SSL server, etc.) during authentication, wherein the endpoint functions as a client or browser. In an illustrative example, the endpoint (e.g., functioning as the client) can initiate an interaction with the device (e.g., functioning as the server) by sending a first message, the device can respond with a second message including the security certificate, the endpoint can verify the validity of the security certificate (e.g., with the issuing certificate authority, against a set of valid fleet certificates received from the FMS, by verifying the certificate's signature, etc.), and the endpoint can initiate the interaction in response to security certificate verification and/or negotiate a session key exchange or generation, using the public key in the certificate, then initiate an interaction encrypted using the session key(s)).

In a second example, the security credentials (e.g., private keys, shared keys, etc.) can be used to encrypt or decrypt communications from another endpoint (e.g., FMS, device, etc.).

In a third example, the security credentials can be used to authenticate the device to another endpoint (e.g., by using a signature cryptographically generated by the security credential, by sharing the security credential, etc.). However, the security credentials can be otherwise used.

In a fourth example, a device can include a FMS connection secret, which can be used by the device to authenticate itself with the FMS when connecting to the FMS and/or when requesting device updates. The device can send the FMS connection secret and/or a derivative thereof (e.g., a signature) with a request to connect to the FMS, wherein the FMS permits connection upon secret validation.

In a fifth example, a device or FMS can generate an access secret for the device (e.g., API token, etc.), wherein external endpoints (e.g., user devices, etc.) can access and/or control the device using the access secret. However, other secrets can be used. In an example, an FMS connection secret can be generated by the FMS, by a third party, by the device, and/or by any other system. Each device preferably has a different FMS connection secret, but can alternatively have a shared FMS connection secret (e.g., between devices of the same fleet).

In a sixth example, the security credentials (e.g., a certificate) can be used to verify that the device configuration and/or scripts are valid, wherein the device ceases use of the configuration and/or scripts once the credentials expire.

In a seventh example, the device can continue to use a configuration and/or script when the associated security credential (e.g., a certificate) expires.

Figure 18:
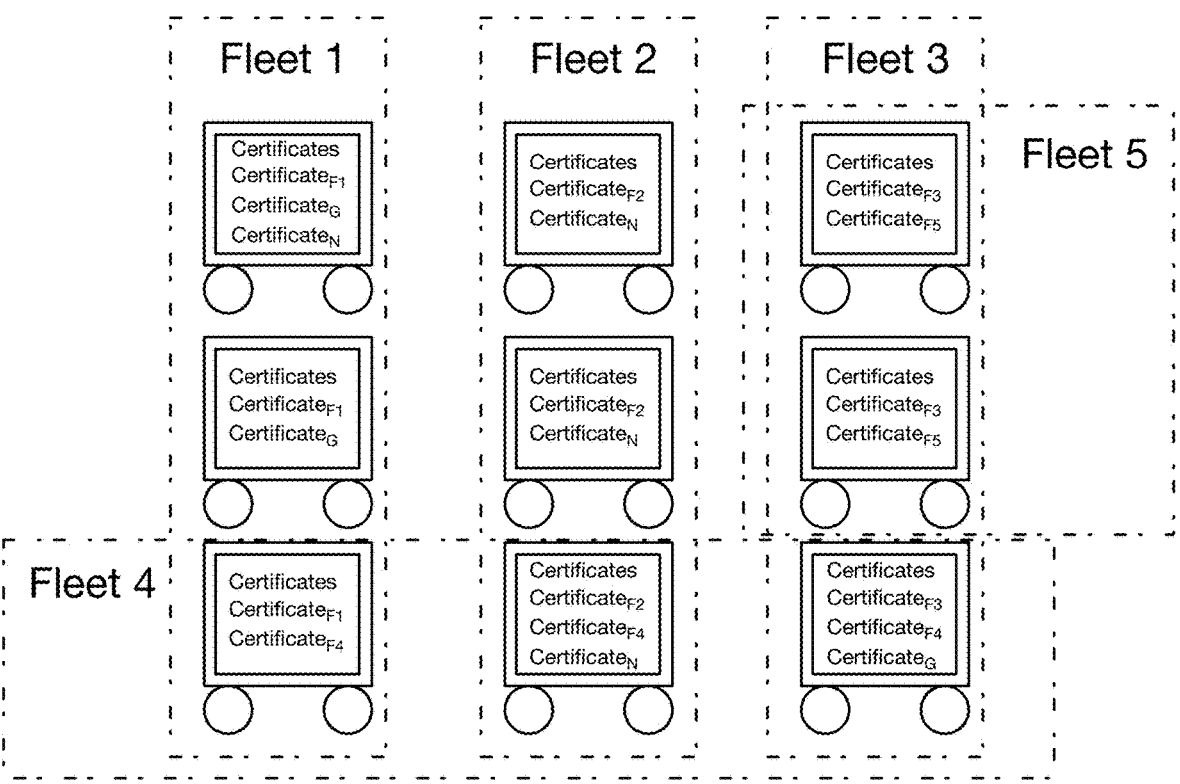
FIG. 18 is an illustrative example of overlapping and non-overlapping device fleets, wherein device fleet membership and permissions are represented through shared certificates.

In an eighth example, the security credentials can be used to validate that the device is authorized to perform an associated interaction with an endpoint (e.g., example shown in FIG. 18). Examples of interactions associated with security credentials can include: communication, control (e.g., of the device, of the endpoint, of a component thereof, etc.), reading data, writing data, and/or other interactions. In this example, the device can provide the security credential or proof thereof (e.g., signature), wherein the endpoint can authorize the endpoint after the endpoint verifies the security credential and/or proof thereof.

In an illustrative example, every robot in the same location shares both a TLS certificate and a personal secret. A robot part managed by the platform (e.g., viam.cloud; app.viam.com's robot domain) receives both pieces of this information on startup and periodically asks if there is a new TLS certificate (e.g., once an hour). Using the TLS certificate, a part process (e.g., RDK) can host a secure server and use the certificate with mutual TLS to authenticate itself to other robots without having to send any secrets when on the same local network; this is accomplished by using multicast DNS or otherwise accomplished. If the other robot cannot be found locally, a WebRTC connection or other connection can be established using the robot's personal secret, not the location secret.

In a specific illustrative example, as soon as a fleet (e.g., a location) is created for the first time, the auth.CertificateManager is notified and begins to issue the fleet a TLS certificate. The auth.CertificateManager can use the ACME protocoli to talk to the system's configured TLS provider (e.g., Let's Encrypt2) and then issue a TLS certificate that will last for 90 days for the location under the wildcard DNS names of *.<location id>.viam.cloud and *.<location id>.local.viam.cloud. When a certificate is partway (e.g., 33%, 50%, etc.) through its lifetime, the system can make a note to renew the certificate. This means the system can expect robots in a single location to come online once within 2 months after getting its last certificate in order to not have an expired certificate. In order to provide a better user experience around having a TLS certificate as soon as a location is created, the system can employ the data.LocationPreallocator to have a minimum number of locations always created and unassigned, such that the certificate manager picks those up for certificate issuance.

However, the security credentials can be otherwise used.

Security credentials can include certificates (e.g., TLS certificates, SSL certificates, wildcard certificates, signed messages, etc.), secrets (e.g., symmetric keys, public/private keypairs, etc.), login credentials, security keys, API tokens, and/or other credentials. Examples of credentials associated with a device can include: a personal secret (e.g., associated with the device itself, known by the device and the FMS, etc.), a fleet secret (e.g., shared between members of the same fleet), a set of interaction certificates (e.g., shared between members of a subfleet; authorizes a predetermined set of interactions with a specific set of devices; etc.), and/or any other suitable set of credentials.

The security credentials can be generated by: the FMS, a third party credentialing service (e.g., a certificate issuer, a certificate authority or issuer, such as Comodo, DigiNotar, etc.), the device, a set of devices (e.g., in a multiparty secret generation ceremony), and/or by any other suitable entity. Credentials can be provided to a device by the manufacturer, by the FMS, by a device, and/or by any other suitable endpoint. Credentials can be provided to a device: once (e.g., during setup, during manufacture, etc.), periodically, when communication between a device and endpoint is established, when a condition is met (e.g., when a new credential is available for the device), and at any other time. In a specific example, the FMS can request a security credential from a credential authority (e.g., certificate authority) for the devices within a fleet (e.g., a wildcard certificate), and provide the security credential to each device within the fleet as part of the respective device's update. The device can then use the updated credential during operation. However, the security credentials can be otherwise determined.

The security credentials can be generated: once, periodically, upon occurrence of a predetermined event (e.g., device entering the fleet, device exiting the fleet or physical location, user request, etc.), at a predetermined frequency relative to the certificate expiration duration and/or device update frequency, and/or at any other suitable time. For example, one or more of the security credentials can be rotated, periodically requested, and/or otherwise updated at a predetermined frequency. Alternatively, one or more security credentials can be static. Security credentials can expire at a predetermined time, upon occurrence of a predetermined event, be persistent, and/or have any other suitable set of temporal conditions. Security credentials are preferably agnostic to a physical location, but can alternatively be dependent upon a physical location (e.g., expire or rotate when the device leaves the physical location, etc.).

Security credentials can be specific to a fleet, individual device, fleet authority, third party module, or other set of devices, or be shared. Security credentials are preferably different for different fleets, but can alternatively be shared across fleets. Security credentials can be the same or different across devices of the same fleet. Different types of security credentials can be shared or specific to the device. For example, each device can have a different personal secret, but share fleet secrets and certificates. However, the security credentials can be otherwise shared or generic.

The FMS preferably stores a copy of the security credentials for each device (e.g., all security credentials for the device, only the valid security credentials for the device, etc.), but can alternatively only store the security credentials that have not been sent to the device, only the security credentials needed for FMS-device communication, and/or any other suitable set of security credentials. The device can store a copy of the security credentials for the respective device (e.g., all security credentials for the device, only the valid security credentials for the device, etc.), a copy of all or a portion of the security credentials for the remainder of the fleet (e.g., public keys for other devices, a set of valid certificates for other devices, etc.), and/or store any other suitable information.

Each device can be associated with one or more concurrently-valid credentials.

Different credentials can be associated with different interactions (e.g., different interaction permissions; enable different interactions after robot identity validation using said credential; etc.). Interaction permissions per credential can be set by default, by the fleet authority, by another entity, and/or otherwise determined. Different interactions can include: device connection (e.g., with a set or subset of other devices), other device control, reading information from the other device, writing information to the other device, and/or other interactions. In an example, a first set of credentials enables connection with a first set of devices (e.g., a subfleet) but does not enable connections with a second set of devices (e.g., the remainder of a fleet). In a second example, the robots within the fleet are associated with a hierarchy (e.g., of locations), wherein different certificates are associated with different hierarchical levels and/or different interaction permissions. In a third example, a first set of credentials enables read-only access to device outputs, while a second set of credentials enables two-way communication between devices. In a specific example, fleet credentials authorize all devices in the fleet, but do not authorize two-way communication.

Different security credentials can be used in different operation contexts. For example, a first security credential (e.g., personal secret) can be used for communication with endpoints outside the local network, a second security credential (e.g., location secret, fleet secret, etc.) can be used for communication with endpoints sharing the same local network, a third security credential (and/or no security credential) can be used for communication between parts of the same device (e.g., wherein parts of the same device can be inherently trusted), and/or a fourth security credential can be used for communication with third-party endpoints (e.g., endpoints outside of the platform). These different security credentials can all be provided by the FMS, by a third-party certificate issuer, by different entities (e.g., by the FMS and the third party endpoint), and/or by any other suitable entity.

In variants, the system can use one or more certificates, which function to ensure that the device configurations stay updated, to authenticate the device's identity to other endpoints, and/or otherwise ensure device security. Each device can be associated with one or more certificates. Different certificates can be associated with: different interactions, different sets of devices (e.g., different fleets, subfleets, etc.), and/or be otherwise used. Examples of interactions that can be associated with different certificates can include: communication connections, instruction transmission (e.g., wherein the device can send device updates to the other device), remote operation (e.g., wherein the device can remotely control or instruct another device), and/or other instructions. A certificate can be a website certificate (e.g., Secure Sockets Layer (SSL)/Transport Layer Security (TLS) certificate), a signed message, and/or any other suitable certificate. The certificate can be signed (e.g., using a private key, a symmetric key, etc.) by a trusted third party (e.g., by a certificate issuer, by the FMS, by the fleet authority, and/or by any other suitable entity. The certificates for each device are preferably obtained (e.g., requested from the certificate issuer) by the FMS, stored by the FMS, and sent to each device responsive to an update request received from the respective device (e.g., a certificate update request), but can alternatively be obtained and stored by the device, by a user device, and/or by any other suitable system.

Figure 4:
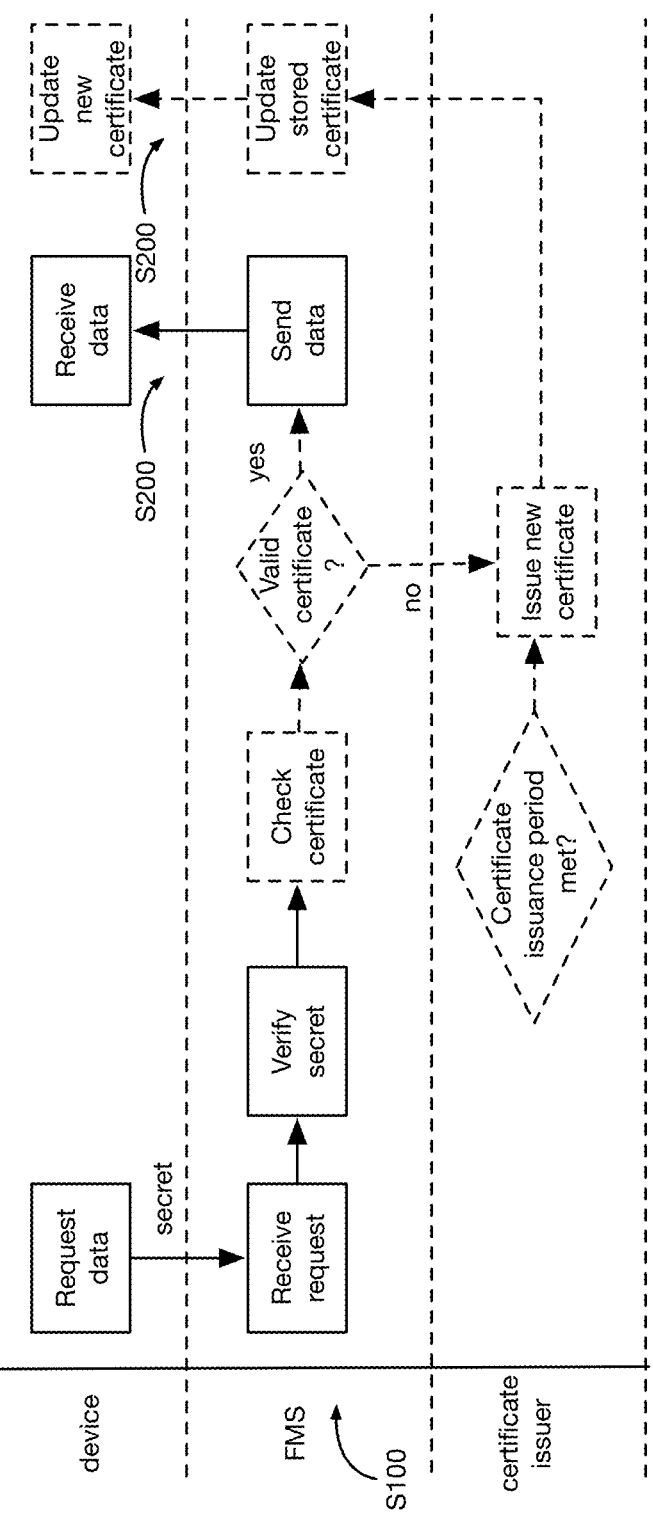
FIG. 4 is a schematic representation of an example of device updating.

Certificates can be specific to a fleet, individual device, fleet authority, third party module, or other set of devices. In an example, all devices in the same fleet share the same certificate. In this example, the certificate is preferably a wildcard certificate, but can alternatively not be a wildcard certificate. Certificates can be issued and/or signed by: a third party, by the FMS, by a fleet authority, or by another entity. In an example, the FMS can obtain a certificate from a third party certificate issuer for the fleet, and provide the certificate to each device (e.g., in the device update); example shown in FIG. 4. The device can then use the certificate to authenticate itself to other devices or endpoints prior to interaction (e.g., connection), wherein the other devices can validate the certificate signature, verify that the certificate is still valid, compare the certificate against its own copy of the certificate (e.g., also received from the FMS), validate the certificate against the third party database of valid certificates, and/or otherwise authenticate the device. However, the certificate can be otherwise used.

The certificates preferably expire, but can alternatively be persistent. In variants, the certificates can expire on a timeframe longer than the device connection frequency to the FMS and/or the device update frequency, such that the device can always store one or more valid certificates (e.g., if the device is updated on the expected schedule). However, the certificates can expire on a shorter time frame, upon occurrence of a predetermined event (e.g., user request, FMS connection, etc.), and/or at any other suitable time. Each device is preferably associated with one or more valid (e.g., unexpired) certificates at any given time, but can alternatively be associated with a single valid certificate, and/or any other number of certificates. In an example, the device can periodically receive updated certificates (e.g., with later expiration dates) while the device is periodically connecting to and requesting updates from the FMS, wherein the device can halt operation if no valid certificate is available (e.g., no valid certificate is locally stored onboard the device). When the certificate is issued, it is preferably non-expired but can alternatively be expired or have some other expiration status.

Certificates can also be shared between device sets (Example shown in FIG. 18). In a variant, credentials are shared among devices within a fleet. In this variant, credentials authenticate device membership in the fleet. Different fleet hierarchies (e.g., subfleets, etc.) can be associated with different credential sets. In an example, each device can be associated with an organizational level certificate set, a fleet certificate, a subfleet certificate, and a subsubfleet certificate).

However, the certificates can be otherwise configured and/or used.

However, the device information can include any other suitable set of information.

The FMS can additionally or alternatively store fleet data, device data, and/or any other suitable data. Fleet data can include data generated by the fleet, data used by the fleet (e.g., training data, hooks, etc.), derivative data (e.g., summary data, statistical analyses, etc.) from the device data generated by devices within the fleet, and/or other data. Device data can include data generated by the device (e.g., device states, measurements, maps, etc.), derivative data from the device data, and/or other data.

However, the FMS can store any other suitable data, be otherwise configured, and/or be otherwise used.

The system can be used with a set of devices, which function to interact with their surrounding environments. Examples of devices can include: robots, IOT devices, autonomous vehicles, remote computing systems, smartphones, laptops, drones, and other devices.

The devices are preferably physical and interact with a physical environment but can additionally or alternatively be virtual and interact with a virtual environment. Each device can store one or more: scripts, security credentials, logs, lists of other devices in the same fleet(s), and/or any other suitable set of device information. Each device can be associated with one or more fleets, fleet management systems, and/or any suitable semantic clustering or grouping of devices.

Each device can function as a client, as a server, or both.

In variants, each device can include one or more parts. The parts of each device are preferably physically connected together, but can alternatively not be connected together. In examples, the parts can be mounted to each other, mounted to a common part, mounted to a common base, indirectly mounted to each other, and/or otherwise connected to each other.

The device part is preferably a physical part, but can alternatively be virtual. Each device part can function as a resource that can be individually (e.g., directly) programmed, accessed, and/or controlled, but can alternatively be indirectly operated (e.g., through a master part, through a central processing system, etc.).

Examples of device parts that can be used can include: a processing system (e.g., a microprocessor, MCU, CPU, GPU, TPU, etc.), a communications system (e.g., wired, wireless communications system, etc.; a radio antenna, Bluetooth transmitter, speaker, Wi-Fi antenna, ethernet connection, etc.), a set of actuators (e.g., end effectors, wheels, robotic arms, wheels, motors, pneumatic actuators, brakes, servos, etc.), a set of sensors (e.g., cameras, accelerometers, IMUs, GPS, etc.), and/or any other suitable part.

In an example, the device parts can be configured in the manner described in U.S. Ser. No. 18/138,963 filed 25 Apr. 2023, incorporated herein in its entirety; alternatively, the device can be otherwise configured.

In this example, each device part can be controlled by its own processing system, by a master part of the device, by a remote endpoint (e.g., remote client), and/or by any other suitable system. Each part can operate online (e.g., connected to the internet) or offline (e.g., without an internet connection, without an external wireless connection, etc.). Each part can be independently controlled, be controlled as part of a set, or be otherwise controlled. When the part is controlled as part of a set, the same control instructions (e.g., service calls, component calls, etc.) can be sent to each part of the set, or be otherwise controlled. The set can include: a subset of parts on the same device, set of parts from different devices (e.g., sharing a common parameter, such as the same component type), and/or be otherwise defined.

In this example, all parts can have their own processor or use the processing system of the device. All parts can have their own address (e.g., MAC, IP), semantic identifier (user-defined or automatic) or other individual sub-components. All parts can be considered devices. Different parts in the same device are preferably controlled by the same entity, but can alternatively be controlled (e.g., directly or indirectly) by different entities (e.g., users, FMS's, software modules, etc.). Each part can be associated with at least one part certificate, which can be used to validate the part with other parts (e.g., other parts of the same or different device). Alternatively, all parts on a device are inherently trusted by other parts in the same device. Alternatively, parts have no part certificate.

In variants, each part (e.g., physical part, virtual part) can be associated with a set of services (e.g., software services, libraries, applications, modules, etc.). Each service can provide a discrete unit of functionality, and/or be otherwise defined. Services can be: models (e.g., trained machine learning models, statistical models, etc.), and/or any other suitable logic or computation. Services can be predefined and accessible to all devices, custom-defined (e.g., specific to a user account), and/or otherwise defined. Examples of services include: remote control, data management, frame management (e.g., conversion between reference frames, using calibration matrices), object detection, motion planning, navigation planning, slip detection, spatial math, point cloud analysis, vision algorithms (e.g., keypoint detection, object detection, object segmentation, Delaunay triangulation), calibration, execute machine learning models (e.g., perform inference or prediction; trained onboard or remotely; etc.), device modules (e.g., device monitoring, management APIs, etc.), frame systems (e.g., to hold the reference frame information for the relative position of components in space), SLAM (e.g., simultaneous localization and mapping), teleoperation, and/or any other suitable task. Examples of machine learning models that can be used include: classical approaches (e.g., linear regression, logistic regression, decision tree, SVM, nearest neighbor, PCA, SVC, LDA, LSA, t-SNE, naïve bayes, k-means clustering, clustering, association rules, dimensionality reduction, etc.), neural networks (e.g., CNN, CAN, LSTM, RNN, autoencoders, deep learning models, etc.), ensemble methods, rules, heuristics, equations (e.g., weighted equations, etc.), selection (e.g., from a library), regularization methods (e.g., ridge regression), Bayesian methods (e.g., Naïve Bayes, Markov), kernel methods, probability, deterministics, genetic programs, and/or any other suitable model. The models can be trained using supervised learning, reinforcement learning, unsupervised learning, and/or otherwise trained.

Each service can be accessed remotely, only accessible locally (e.g., by the processes executing on a shared computing system), and/or otherwise accessible. Each service can be independently executed or executed as part of a set. Each part can include one or more services of the same or different type. Each service is preferably a process executing on the processing system of the respective physical part, but can additionally or alternatively wholly or partially execute in a remote computing system, on another physical part's processing system, and/or on any other suitable system. Each part and associated services can be represented as a single device and/or be otherwise represented.

Each device preferably stores its own set of device information (e.g., scripts, configurations, credentials, etc.) locally, but can alternatively store the device information remotely (e.g., and retrieve the information when needed), or otherwise store the device information. Each device can store one or more versions of the device information. The device can operate offline, using the device information (e.g., most recent version of the device information, any valid device information, etc.); using remote control instructions received from an authorized remote endpoint (e.g., that has an access token for the device); and/or operate based on any other suitable information. Each device can additionally or alternatively store fleet information, such as a list of other fleet members, a set of fleet credentials (e.g., used to verify other members of the fleet), and/or other information. Each device can optionally generate and/or store device information.

Each device preferably establishes connections and/or obtains external information using web-standard protocols (e.g., instead of robot-standard protocols, such as ROS), but can additionally or alternatively establish connections and/or obtain information using any other suitable protocol. The devices can use: local communication networks (e.g., local area network, short-range networks, etc.), remote communication networks (e.g., cellular, the Internet, etc.), and/or any other suitable network. The communication network can be based on: wired connections, wireless connections, and/or any other suitable set of connections. Protocol options include request-response communication protocol (WebRTC, gRPC, WebSockets, HTTP, or other), Pub-sub, SOAP (in-only, out-only, in-out, etc.), REST, or any other suitable protocol.

The device preferably obtains external information using a client-server interaction (e.g., remote procedure calls (RPC), REST, etc.) but can additionally or alternatively obtain external information using a publisher-subscriber architecture and/or any other suitable interaction architecture. In an example, the device can connect to another endpoint (e.g., client, FMS, device, user device, etc.) using an SSL handshake and/or TLS handshake, wherein the device and the endpoint both store SSL certificates (e.g., to ensure security/integrity of the connection from unauthorized snoopers; for mutual TLS to authenticate both ends; etc.). In another example, the device can connect to the FMS using a stored secret. However, the devices can be otherwise configured.

Device connections and requests can be controlled by a client executing onboard the device, by the FMS, or be otherwise controlled.

Each device preferably controls its own FMS connection schedule (e.g., wherein the device is usually disconnected from and/or not controlled by the FMS); alternatively, each device's connection schedule can be controlled by the FMS or by any other suitable system. In a first example, the device attempts to connect to the FMS (e.g., sends a connection request) at a predetermined frequency (e.g., every 10 seconds, every minute, every hour, every day, every week, etc.). In a second example, the device can attempt to connect to the FMS responsive to occurrence of an event, such as security credential expiration or memory shortage. However, the device can connect to the FMS at any other suitable time.

Similarly, each device can control its own update schedule. For example, the device can control: when it connects to the FMS, when it requests updates from the FMS, and/or otherwise control its update schedule. In an example, the device can wait until a physical manipulation or other task is completed before requesting updates from the FMS (e.g., in variants where updating the device requires the device to shut down). In another example, the device can wait until the device information is nearing invalidation or expiration before requesting an update. In another example, the device can control when it connects to the FMS, wherein the FMS determines whether an update needs to be sent (e.g., whether an update is available for the respective device).

Alternatively, the FMS can control a device's update schedule. In this variant, the FMS can periodically attempt to connect to each device and send the update responsive to device connection.

However, the devices can be otherwise updated.

However, the devices can be otherwise configured.

4. Method

In variants, a method of managing a set of devices includes: determining device information S100, sending device information to the device S200, and operating the device using the device information S300 (e.g., example shown in FIG. 1). The method functions to provide a scalable method of managing multiple fleets of devices (e.g., using limited FMS resources). However, the devices can be otherwise managed.

All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed.

Determining device information S100 functions to define the information to be used by the device during device operation.

Figure 2:
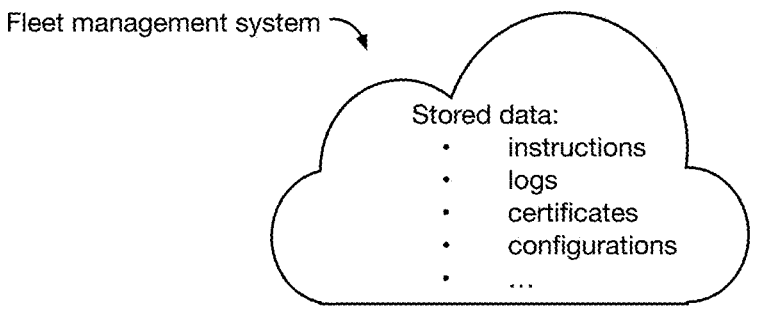
FIG. 2 is an illustrative example of data stored by the fleet management system.
Figure 3:
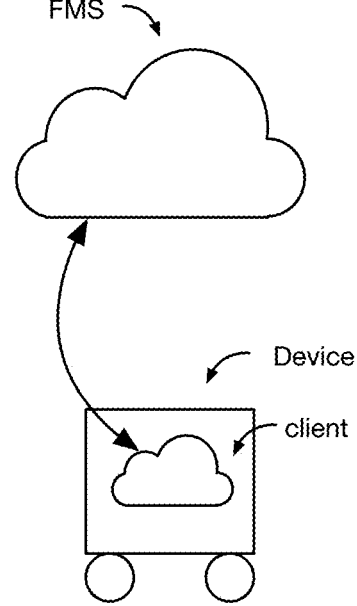
FIG. 3 is an illustrative example of fleet management system-device connection.

The device information can be determined by: a user, a third-party entity, the FMS, the device, and/or by any other suitable entity. The device information can be determined by: receiving the device information, generating the device information, retrieving the device information, and/or otherwise determining the device information. The device information can be stored by: the FMS, the device, and/or by any other suitable component. In an example, the FMS aggregates data in a central repository for fleet access (e.g., example shown in FIG. 2, FIG. 3, and FIG. 8). The FMS can persistently store device information (e.g., including historic or expired device information), only store current versions of the device information, transiently store device information (e.g., until the device information has been transmitted to all relevant devices), and/or store the device information for any other suitable period of time. Device information can be stored for a variable or fixed amount of time. In an example, device information can be moved to a different storage system after a predetermined amount of time. Device information can be stored by the FMS, or on a third party system wherein the device directly retrieves from the third party system, or the FMS retrieves information from the third party system upon request from the device.

S100 can occur before device connection, after user information entry, at a predetermined frequency (e.g., at a predetermined update frequency, etc.), upon occurrence of a predetermined event (e.g., external event, device event, etc.), when new device information is available, and/or at any other suitable time. S100 is preferably performed independent of S200 (e.g., wherein the new device information is stored without sending the new device information to the device until the device next requests an update), but can alternatively be dependent upon S200.

In a first example, device information is determined when the device first enters the fleet, during fleet setup, or during device setup.

In a second example, all or a subset of the device information is determined on a schedule, wherein the schedule can be determined by a fleet authority, FMS, device, endpoint, or user. For example, security credentials can be updated at a first frequency, wherein the security credentials can expire at a second frequency (e.g., less frequently than the first frequency), and/or wherein the device connects to the FMS and/or requests security credential updates at a third frequency (e.g., more frequently than the first frequency).

In a third example, all or a subset of the device information is determined when a new version is available. In a first example, new device scripts are determined when a user (e.g., fleet authority) provides new scripts. In a second example, new device scripts are determined when a third party updates the respective third party module. In this example, the FMS and/or device can periodically check the third party repository for updates, or the third party module can push the update to the FMS and/or device.

In a fourth example, device information is determined when, upon the receipt of a communication request from the device, the FMS updates its information about the device. The communication request may be sent by the device at a specific predetermined time (e.g. on schedule), in response to an event, and/or at any other suitable time.

In a fifth example, device information can be determined after a predetermined event occurs. In a first example, new device information can be determined for a first device when a predetermined device data value is received from another device of the fleet. In an illustrative example, a device information update can be made available to the first device when the other device's device data indicates that the device information update does not have bugs.

However, the device information can be determined at any other suitable time.

In a first variant, S100 includes receiving device information from a fleet authority or other source. The source and/or the information from the source can be unverified or verified. In an example, information from a source can be verified by a third party. In a first embodiment, a fleet authority provides the FMS with device information (e.g., script, configuration file, etc.), optionally describing which third party modules to use, and which devices to apply the device information to. The FMS optionally retrieves referenced third party modules, code fragments, and/or other code, and constructs the overall package (e.g., a configuration file, script, security credentials, etc.). The FMS can associate the device identifiers for identified devices with the package, and send the package to the identified devices when the identified devices connect to the FMS. In a second embodiment, the fleet authority provides security credentials and optionally identifies a set of devices associated with the security credentials, wherein the FMS receives the security credentials and stores the security credentials in association with the identified devices. In a fourth embodiment, a third party entity provides security credentials, wherein the FMS receives the security credentials and stores the security credentials in association with a set of devices associated with the fleet.

In a second variant, S100 includes retrieving and modifying or generating device information. In a first embodiment, the FMS retrieves data from a user database or directly from a user. In a second embodiment, the FMS generates a security credential (for example, a personal secret or a fleet secret) using a key generation ceremony, a cryptographic method, random generation, hashing (for example, based on device ID & timestamp or other information), or any other suitable method; and stores the credential in association with the device ID or fleet ID. In a third embodiment, the FMS generates a security credential for devices in response to a fleet authority request, provides the security credential to the fleet authority, and associates the security credential with the devices.

In a third variant, determining includes receiving information from the device. In an example, a device sends the FMS information about itself. In a second example, a device sends the FMS information about other device(s). In other variants, the FMS can determine device information using other methods.

However, S100 can be otherwise performed.

Figure 9:
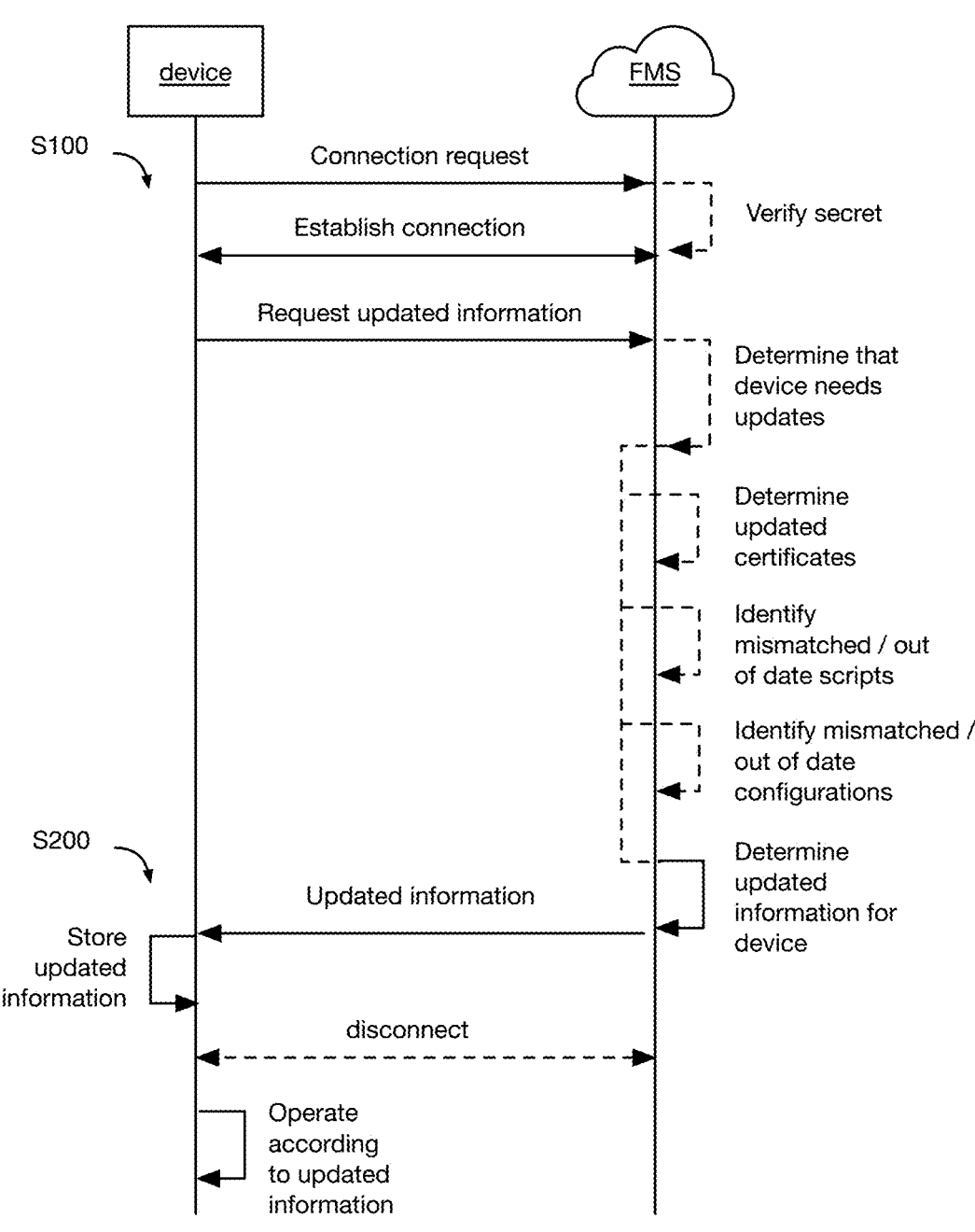
FIG. 9 is a schematic representation of an example of updating a device.

Sending device information to the device S200 functions to provide the device with information for device operation (e.g., example shown in FIG. 9). S200 can be performed by the FMS, another device (e.g., within the same fleet, within a different fleet), a user device, and/or any other suitable endpoint.

S200 is preferably performed independently from S100, but can alternatively trigger S100, be performed in response to S100, and/or otherwise performed. The device information is preferably sent asynchronously from device information determination, but can additionally or alternatively be sent in real time (e.g., when a user device is remotely controlling the device).

The device information that is sent to the device can be: the most device information for the device, fleet, subfleet, and/or any other suitable organizations associated with the device. The device information can be: the most recent device information, all intervening device information, and/or any other suitable information.

The device information is preferably sent via a direct connection, such as a peer-to-peer connection or a client-server connection, but can alternatively be sent via an indirect connection (e.g., via an intermediary, etc.), or other connection. The device information can be sent over an intermittent connection (e.g., persisting for: a single update; a single update request-response interaction; less than a predetermined number of updates or update request-response interactions; less than a threshold duration, such as less than 1 day, 1 hour, 10 minutes, etc.; etc.); a persistent connection (e.g., persisting through more than a threshold number of update request-response interactions; more than a threshold duration, such as more than 10 minutes, 1 hour, 1 day, etc.); and/or a connection of any other suitable duration.

Figure 6:
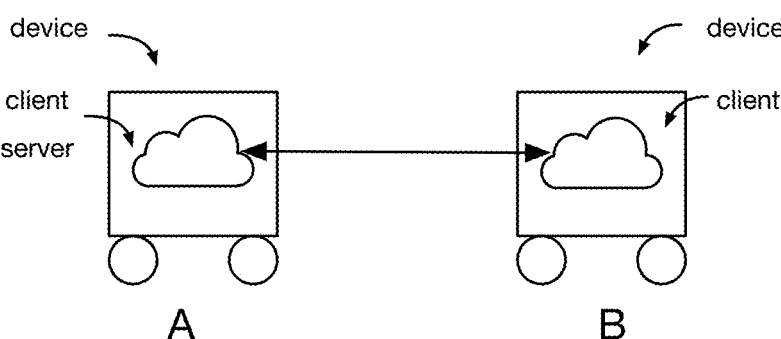
FIG. 6 is an illustrative example of inter-device communication.
Figure 7:
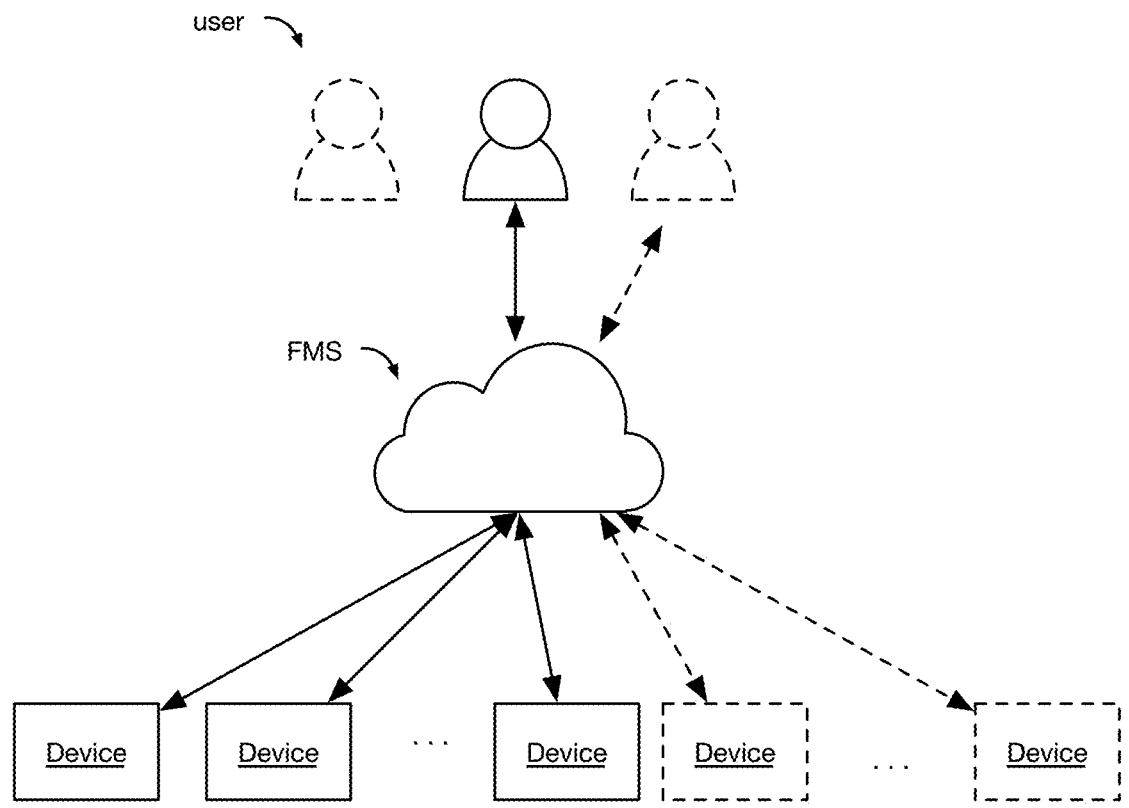
FIG. 7 is a schematic representation of an example of users prompting an FMS to asynchronously update specific devices.

The device information can be sent: after a connection is established with the device, after validating the sending endpoint's identity (e.g., by validating security credentials, a shared secret, etc.; example shown in FIG. 6), after verifying that the device's stored device information is out of date, and/or after any other suitable condition is met.

In a first variant, device information is sent to the device responsive to an update request from the device. Device information can optionally include an update of the device's parameters. This variant can include receiving a connection request from a device, optionally validating the device identity, determining updated device information, establishing a connection to the device, and sending device information (e.g., example shown in FIG. 9). The endpoint receiving the request is preferably the FMS, but can alternatively be another device in the same fleet, a device in a different fleet, a user device, and/or any other suitable device. In an example, the device can connect to the FMS on a predetermined schedule (e.g., once every 6 hours). In variants, connection attempts can be staggered such that different devices connect to the FMS at different times, such that the fleet as a whole is not disrupted.

Figure 5:
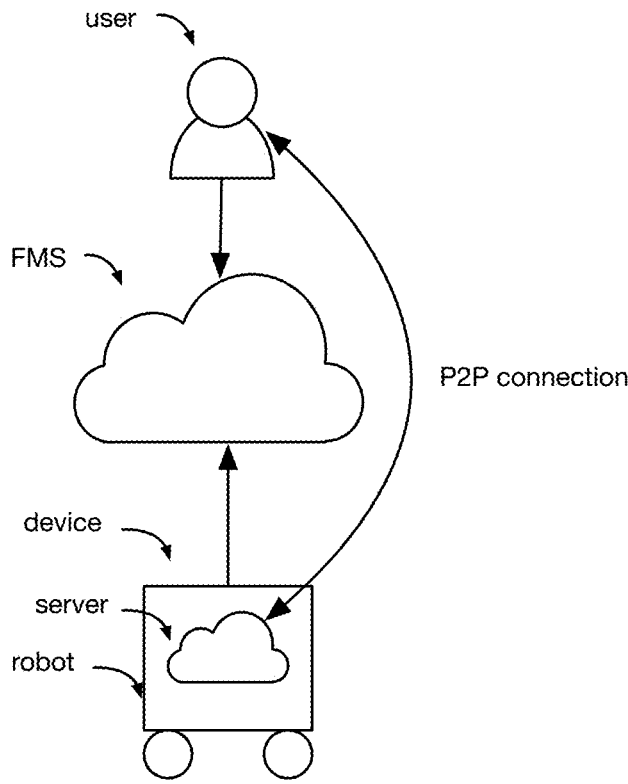
FIG. 5 is an illustrative example of a user-device communication.
Figure 16:
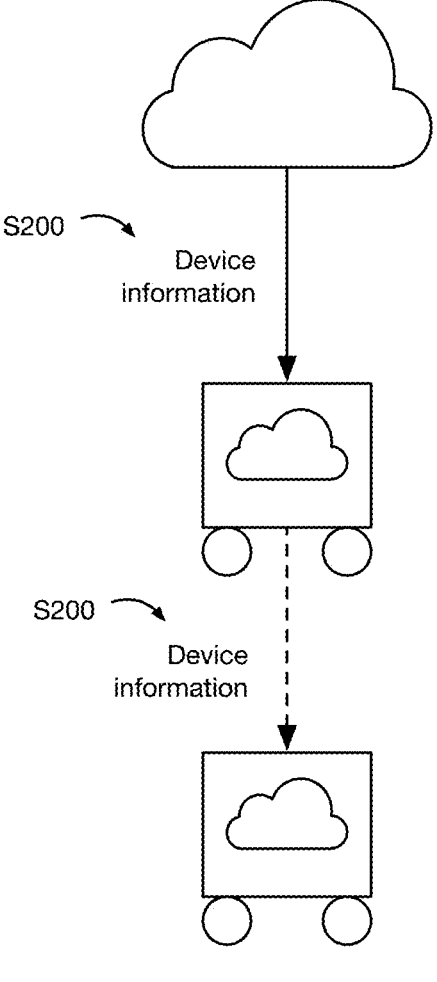
FIG. 16 is an illustrative example of a device receiving information indirectly from an FMS through another device.
Figure 17:
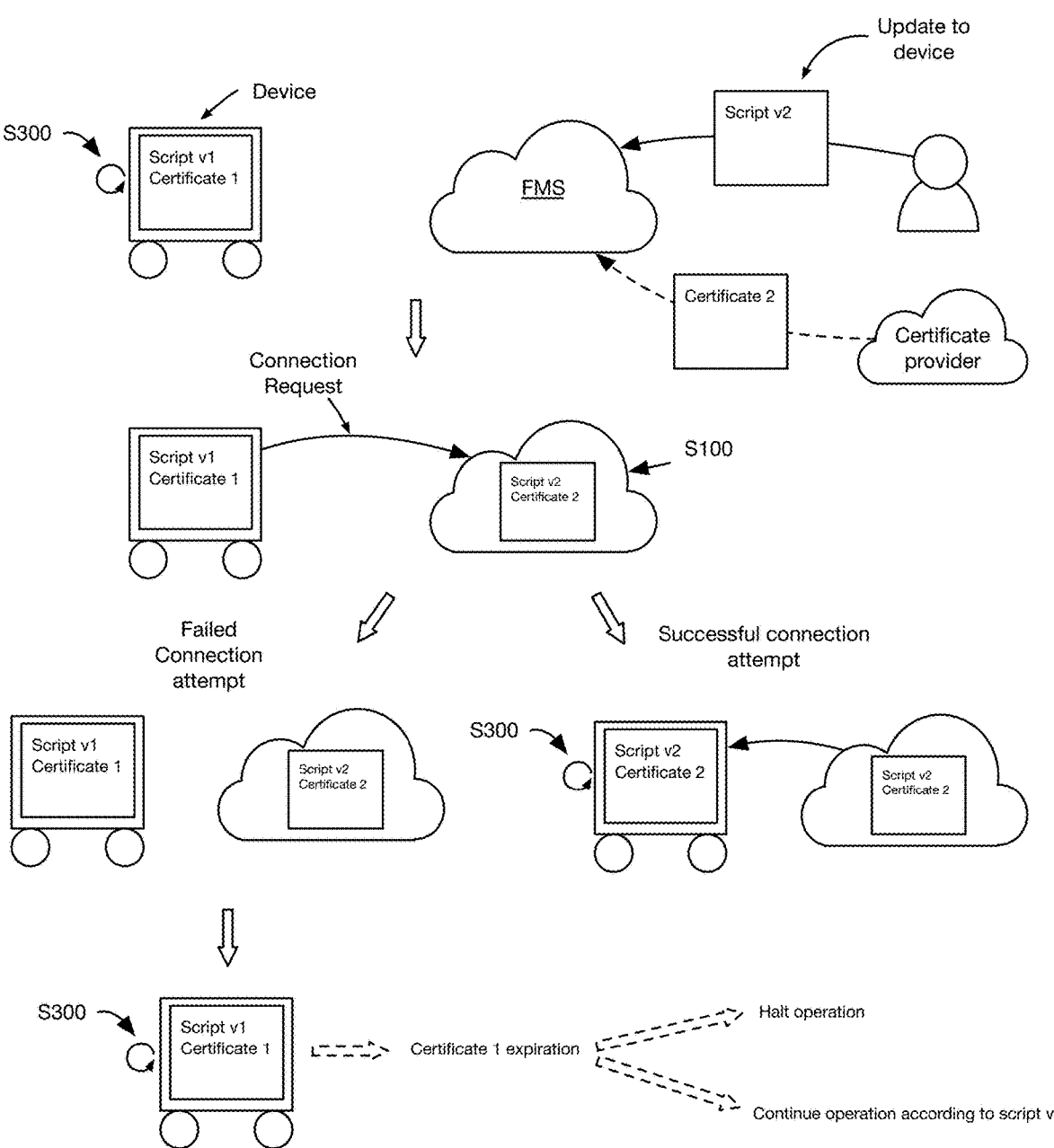
FIG. 17 is an illustrative sequence of a device maintaining operability even in the case of FMS communication failure.

Receiving a connection request functions to initiate a device-endpoint connection. The connection request is preferably received by the FMS but can alternatively be received by the device, another device (e.g., example shown in FIG. 16), and/or by any other suitable endpoint. The connection request is preferably sent by the device, but can alternatively be sent by the FMS, another FMS, another device, the user device (e.g., example shown in FIG. 5), a third-party, and/or any other suitable endpoint. The connection request can include: security credentials (e.g., personal secret, fleet secret, etc.), the current version of the device information set stored on the device, a request for specific types of device information (e.g., the device information that is expiring), and/or any other suitable information. The connection request can be generated, sent, and/or received at a predetermined frequency (e.g., every second, minute, hour, day, week, month, etc.), at a predetermined time before or concurrent with current certificate expiration, when a predetermined event occurs (e.g., device operation error, specific object sensed in the environment, during downtime, etc.), when the device connects to an external network (e.g., Internet, cellular network, fleet), upon user request, and/or at any other suitable time.

Validating the device functions to verify the device's identity, validating that the device is a member of the fleet, and/or validating any other suitable device parameter. The device can be validated by: the FMS, another device, and/or any other suitable system providing the device information and/or receiving the connection request. Validating the device can include validating a personal secret, fleet secret, or any other suitable credential. Validating the device can include: validating a certificate sent by the device, validating a signature generated by the device (e.g., verifying that the request was signed using a personal secret or fleet secret), decrypting a message sent by the device (e.g., using a private key paired with the public key used to encrypt the device, using a symmetric key shared with the device), verifying that the device identifier is on a list of known devices, and/or otherwise validating the device.

Additionally or alternatively, the method can include validating the endpoint (e.g., at the device). In a first example, the endpoint is implicitly trusted (e.g., the FMS is implicitly trusted). In a second example, the device can request a proof of identity from the endpoint, wherein the endpoint identity can be validated as discussed above for device validation. In a third example, the device can verify that the endpoint (e.g., remote device, user device, etc.) has a valid access token associated with the device (e.g., wherein the device generated the access token or the token was cryptographically generated using secrets known to the device). However, the endpoint can be otherwise validated.

Determining updated information functions to determine valid information for device operation. The updated information can include: the most current device information stored for the device identifier, all device information since the last update (e.g., wherein the last update is determined based on the last update timestamp, the currently-used device information version provided by the device, etc.), and/or any other suitable device information. In a first variation, this can include identifying the latest version of the device information (and/or pieces thereof). In a second variation, this can include performing an instance of S100, such as retrieving device information from other data sources (e.g., in response to receipt of the request). In a third variation, this can include verifying that the device information (and/or pieces thereof) are not expired. However, updated information can be otherwise determined.

Establishing a connection function to open a communication channel between the device and the endpoint (e.g., device information source). In a first variation, the connection between the endpoint and the device is established using a web-standard protocol, such as a TLS protocol or SSL protocol (e.g., using a certificate stored by the device information source, stored by the device, etc.). In a second variation, a peer-to-peer connection between the device information source and the device is established using a connection framework, such as WebRTC or gRPC. The connection can be a direct or indirect connection (e.g., via a gateway or other intermediary). However, the connection can be otherwise established.

Sending device information to the device can include sending the device information, sending remote control instructions, sending nothing (e.g., if there are no updates to the device, etc.), and/or sending any other suitable data to the device. In a first variant, device information can be sent directly to the device. In an example, a direct connection is established with the device and the update is sent over the direct connection (e.g., example shown in FIG. 5). In a second variant, device information is sent via an intermediary (e.g., another device within the same fleet or in another fleet, a user device, etc.). In an example, device information is sent to a device in a fleet with instructions to update other devices in the fleet, wherein the device sends the device instructions to the other devices (e.g., via P2P connection or another connection; without the FMS in the loop; etc.). Different types of device information can be sent. In a variant, the entirety of the most recent version of device information is sent (e.g., configuration, code, security credentials, etc.). In a second variant, only the difference between the last version and the current version is sent, where the last version is the last version on record with the FMS or the version reported by the device. In an example, if the configuration and code haven't changed, the FMS sends only security credentials. In a second example, if only a portion of the code changes, the FMS sends only the new code and instructions for which code to delete.

In a second variant of S200, the FMS pushes information to the device on a predetermined schedule, wherein the FMS requests to connect to the device, a connection is established, and the FMS sends device information.

Operating the device based on the device information S300 functions to securely control device operation. This can ensure that the device is either using up-to-date device information for operation, ensure that the device's connections to trusted endpoints are secure, and/or perform other functionalities.

S300 can be performed locally and/or offline (e.g., without a connection to the FMS, wide-area network, or other remote endpoint), but can additionally or alternatively require a connection to the FMS, user device, or other source of operation instructions. S300 can be performed independent of S100 and/or S200 (e.g., wherein the S300 instances uses an older set of device information), but can alternatively require S100 and/or S200.

S300 preferably uses device information that is locally stored by the device, but can alternatively use remotely-stored device information. S300 can use: the most recent, unexpired device information, a device information set that the device has been instructed to use, and/or use any other suitable set of device information.

Operating the device can include: executing the scripts (e.g., valid scripts, unexpired scripts, etc.) in the device information using the respective configuration (e.g., valid configuration, unexpired configuration, etc.) in the device information, interacting with other endpoints using the device information, and/or performing other actions.

In a first variant, S300 includes executing the scripts (e.g., code) in the using the respective configuration in the device information. All or a portion of the code can be executed. Executing code can cause the device to interact with the device's physical environment, which can include actuating a device actuator, sensing environmental parameters, and other forms of interaction. Actuating a device actuator can include traversing within the physical environment, acting upon objects within the environment, and other forms of actuation. Executing code can also cause the device to process measurements, for example running ML models or other models. Executing code can also cause the device to enter a dormant mode, such as completely shutting off or ceasing certain operations until some trigger occurs.

Artifacts generated through code execution, device states, device usage, and/or other device information can optionally be sent by the device to the log repository identified in the device information and/or the platform.

In a second variant, S300 can cause the device to interact with other devices. Interacting with other devices can include connecting to other devices, exchanging information with other devices, controlling other devices (which may cause other devices to contact the FMS), updating other devices, and other forms of interaction. Interactions are preferably secured (e.g., encrypted, authenticated using a certificate, such as using a TLS or SSL protocol, etc.), but can alternatively be unsecured. In variants, all connections can include a JSON web token in the header, where the JSON web token can be specific to the other device, to the fleet, and/or otherwise associated with the device.

Figure 20A:
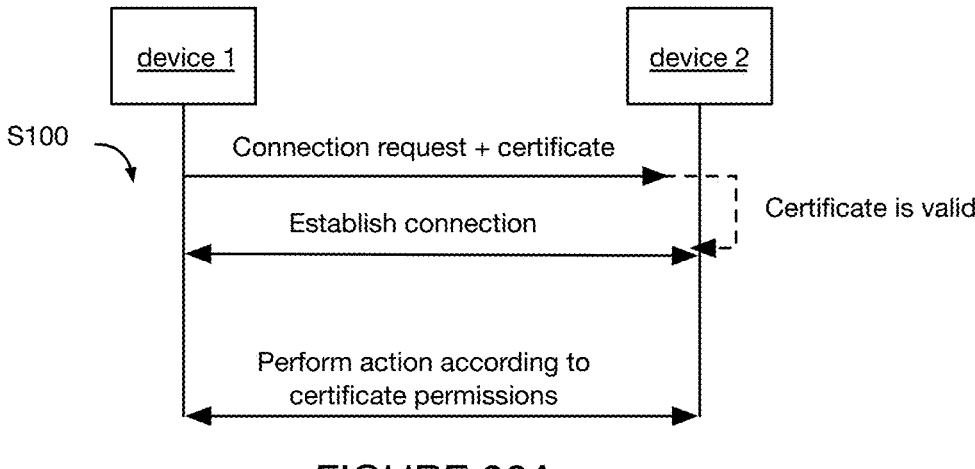
FIGS. 20A and 20B are illustrative examples of a device interaction using a valid certificate and a device interaction using an expired certificate.
Figure 20B:
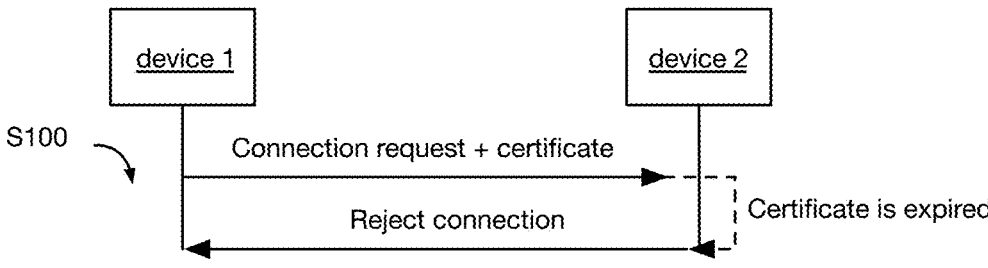

In a first embodiment of the second variant, the device can interact with other devices using a certificate, wherein device can function as a server or alternatively function as a client (e.g., example shown in FIG. 6). The other device can optionally verify that the certificate is not expired and/or is valid before authorizing the interaction (e.g., examples shown in FIGS. 20A & 20B). In a first example, the device uses a third party to validate the certificate (e.g., the certificate issuer). In a second example, the other device verifies the other device's certificate against a local copy of the certificate. In a third example, the other device verifies the certificate by verifying the third party certificate issuer's signature (or by verifying the FMS signature). In a fourth example, the other device verifies the certificate against a certificate database (e.g., FMS database or third party database). In an illustrative example, devices within the fleet can authenticate each other using non-expired, automatically-expiring certificates when connected over a local network, and authenticate each other using a set of secrets when connected over a remote network. Additionally or alternatively, different types of security credentials can be used to authenticate the device's identity in different contexts.

In a second embodiment of the second variant, the device can interact with other devices using a fleet secret, wherein the other device is part of the same fleet or another fleet. In an example, devices share a fleet secret key with one another and use either secret matching or signature verification to verify each other's membership in the fleet.

In a third embodiment of the second variant, the device can interact with other endpoints using a personal secret. In a first example, where a symmetric personal secret is used, a device may use its personal secret to encrypt a message, and the receiving device may use the same secret, stored in association with the device identifier, to decrypt the message. In a second example, where an asymmetric personal secret is used, a device similarly uses a personal secret to encrypt a message which may be decrypted using a public key known by the receiving device.

In a fourth embodiment of the second variant, device interaction with another endpoint can be facilitated by the FMS. For example, two devices connected to the FMS may request the respective connection information for the other device from the FMS, wherein the connection information can be used by the devices to set up a P2P communication channel between the devices (e.g., example shown in FIG. 5).

However, the device can otherwise use the device information to interact with other endpoints.

In a third variant, S300 can include connecting to a user device. Connecting to a user device can include: generating a secret for the device (e.g., an access token, an API token, etc.) using the FMS (e.g., wherein secret generation can be authorized by an authorized user); providing the device connection information (e.g., address) and secret to the user device; and optionally providing the secret to the device. In variants, the secret can be associated with a limited set of permissions, capabilities, and/or device functionalities. The user device can then request a connection to the device using the secret or a derivative piece of information (e.g., a signature), wherein the device validates the secret and/or verify that the secret was generated by the FMS or another trusted source (e.g., using cryptographic verification). The device can then initiate a connection with the user device via WebRTC, gRPC, or another connection, wherein the user can remotely operate the device by sending operation instructions via the user controller device. This can enable users to remotely control one or more devices within the fleet, update the device information, and otherwise directly interact with the device.

In a fourth variant, S300 includes configuring the device according to the configuration information contained within the device information. The device can establish local connections with the constituent parts identified in the configuration, calibrate parts, evaluate configurations, and perform other tasks associated with configuring itself.

However, the device can be otherwise operated.

However, the method can be otherwise performed.

All references cited herein are incorporated by reference in their entirety, except to the extent that the incorporated material is inconsistent with the express disclosure herein, in which case the language in this disclosure controls.

Optional elements in the figures are indicated in broken lines.

Different processes and/or elements discussed above can be defined, performed, and/or controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be manually defined, be custom instructions, be standardized instructions, and/or be otherwise defined. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various elements (and/or variants thereof) discussed above, and/or omit one or more of the discussed elements, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. A fleet management method, comprising, at a robot within a robot fleet:
   receiving a request from a requesting robot, the request comprising an automatically-expiring certificate;
   authenticating the requesting robot by comparing the automatically-expiring certificate against a set of automatically-expiring certificates locally stored by the robot, wherein the robot periodically solicits new sets of automatically-expiring certificates from a fleet management system, wherein the new sets of automatically-expiring certificates are determined before the robot solicits the new sets of automatically-expiring certificates and are not sent to the robot until the robot solicits the new sets of automatically-expiring certificates; and responding to the request responsive to authenticating the requesting robot, comprising actuating a physical component of the robot, wherein actuating the physical component of the robot comprises actuating the physical component according to a set of expiring instructions received from the fleet management system, wherein robot operation according to the expiring instructions is disabled when the automatically-expiring certificate expires.

2. The method of claim 1, wherein the fleet management system determines the new sets of automatically-expiring certificates.

3. The method of claim 2, wherein the set of expiring instructions expires at an instruction expiration frequency and wherein the robot solicits the new sets of automatically-expiring certificates at a solicitation frequency based on the instruction expiration frequency.

4. The method of claim 1, wherein the request comprises action information and wherein the robot performs an action corresponding to the action information.

5. The method of claim 4, wherein the action information comprises an action call.

6. The method of claim 5, wherein the action call comprises a platform-standard action call that is translated to a robot component-specific call by the robot, wherein a component on the robot executes the robot component-specific call.

7. The method of claim 1, wherein periodically soliciting the new sets of automatically-expiring certificates from the fleet management system is performed responsive to an expiration condition of a certificate within the set of automatically-expiring certificates.

8. The method of claim 1, wherein the method is performed while the robot is disconnected from the fleet management system.

9. A device comprising:
   a robotic component; and
   a processing system comprising a set of processors configured to:
   control the robotic component;
   store a first automatically-expiring certificate; and
   send a request to a second device within a fleet, wherein the request comprises the first automatically-expiring certificate and a programmatic instruction, wherein the second device:
   authenticates the device by comparing the first automatically-expiring certificate to a second automatically-expiring certificate stored on the second device; and
   actuates an onboard physical component according to the programmatic instruction received from the device in response to the authentication, wherein actuation of the onboard physical component according to the programmatic instruction is disabled when the first automatically-expiring certificate expires,
   wherein the second automatically-expiring certificate is determined by a fleet management system, wherein the fleet management system determines the second automatically-expiring certificate without transmitting the second automatically-expiring certificate to the second device until a solicitation is received from the second device.

10. The device of claim 9, wherein each device in the fleet stores the second automatically-expiring certificate.

11. The device of claim 9, wherein the processing system is configured to solicit the first automatically-expiring certificate from the fleet management system using a solicitation.

12. The device of claim 11, wherein the fleet management system sends a set of instructions to the device alongside the first automatically-expiring certificate in response to the solicitation, wherein the device operates according to the set of instructions.

13. The device of claim 12, wherein operation of the device according to the set of instructions comprises actuating the robotic component.

14. The device of claim 9, wherein the first automatically-expiring certificate is associated with a first set of actions, wherein the processing system is configured to store a third automatically-expiring certificate for the second device, wherein the third automatically-expiring certificate is distinct from the first automatically-expiring certificate and is associated with a second set of actions distinct from the first set of actions, wherein the second device enables the second set of actions in response to authenticating the third automatically-expiring certificate.

15. A method comprising, at a fleet management system:
    determining a set of automatically-expiring certificates;
    receiving a request from a first robot in a robot set after determining the set of automatically-expiring certificates;
    sending a first automatically expiring certificate from the set of automatically-expiring certificates to the first robot after receiving the request, wherein:

the first robot authenticates the identity of a second robot by comparing a certificate received from the second robot against the first automatically expiring certificate, and actuates a physical component onboard the first robot according to the request in response to authentication of the second robot identity, wherein actuating the physical component onboard the first robot comprises actuating the physical component according to a set of instructions, wherein operation of the first robot according to the set of instructions is disabled when the first automatically expiring certificate expires; and
    determining a new automatically-expiring certificate set without sending a certificate from the new automatically-expiring certificate set to the first robot until a next request is received from the first robot.

16. The method of claim 15, wherein determining the set of automatically-expiring certificates comprises receiving the set of automatically-expiring certificates from a certificate authority.

17. The method of claim 15, wherein the request comprises a set of robot secrets.

18. The method of claim 15, wherein the second robot is distinct from the fleet management system.

19. The method of claim 15, wherein the first automatically-expiring certificate is a Transport Layer Security (TLS) certificate.

* * * * *